(12) United States Patent
Ren et al.

(10) Patent No.: US 10,554,794 B2
(45) Date of Patent: Feb. 4, 2020

(54) INFORMATION TRANSMISSION METHOD AND APPARATUS IN TDD SYSTEM

(71) Applicant: HUAWEI TECHNOLOGIES CO., LTD., Shenzhen, Guangdong (CN)

(72) Inventors: Haibao Ren, Shanghai (CN); Yuanjie Li, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/977,304

(22) Filed: May 11, 2018

(65) Prior Publication Data

US 2018/0295220 A1 Oct. 11, 2018

Related U.S. Application Data

(63) Continuation of application No. PCT/CN2016/104089, filed on Oct. 31, 2016.

(30) Foreign Application Priority Data

Nov. 11, 2015 (CN) .......................... 2015 1 0764970

(51) Int. Cl.
*H04L 29/08* (2006.01)
*H04W 72/04* (2009.01)

(52) U.S. Cl.
CPC ....... *H04L 69/324* (2013.01); *H04W 72/0406* (2013.01)

(58) Field of Classification Search
CPC ..... H04L 69/324; H04L 5/26; H04W 72/0406
See application file for complete search history.

(56) References Cited

U.S. PATENT DOCUMENTS

2009/0219875 A1 9/2009 Kwak et al.
2010/0124184 A1 5/2010 Dayal et al.
(Continued)

FOREIGN PATENT DOCUMENTS

CN 101399645 A 4/2009
CN 101902427 A 12/2010
(Continued)

OTHER PUBLICATIONS

International Search Report, dated Feb. 2, 2017, in International Application No. PCT/CN2016/104089 (4 pp.).
(Continued)

*Primary Examiner* — Afshawn M Towfighi
(74) *Attorney, Agent, or Firm* — Womble Bond Dickinson (US) LLP

(57) ABSTRACT

A method includes: determining a frame structure used for information transmission in the TDD system, where each frame based on the frame structure includes N subframes with a timing length of K subframes, one super frame includes M consecutive subframes, M is a common multiple of N and 2K, each super frame includes at least one downlink-only subframe, and further includes at least one of an uplink-only subframe, a type-1 subframe, or a type-2 subframe, the downlink-only subframe includes a downlink symbol and no uplink symbol, the type-1 subframe includes an uplink symbol and a downlink symbol with uplink symbols less than downlink symbols, the type-2 subframe includes an uplink symbol and a downlink symbol with uplink symbols more than downlink symbols, and the uplink-only subframe includes an uplink symbol and no downlink symbol; and sending and/or receiving a message based on the frame structure.

23 Claims, 12 Drawing Sheets

(56) References Cited

U.S. PATENT DOCUMENTS

| | | | |
|---|---|---|---|
| 2012/0093080 A1* | 4/2012 | Lee ................... | H04L 27/2602 370/328 |
| 2014/0293909 A1* | 10/2014 | Xu ..................... | H04B 7/2656 370/329 |
| 2016/0173239 A1 | 6/2016 | Kim et al. | |

FOREIGN PATENT DOCUMENTS

| | | |
|---|---|---|
| CN | 102025411 A | 4/2011 |
| CN | 102158325 A | 8/2011 |
| CN | 102271032 A | 12/2011 |
| CN | 102396168 A | 3/2012 |
| EP | 2648358 A2 | 10/2013 |
| WO | 2015020427 A1 | 2/2015 |
| WO | 2015163709 A1 | 10/2015 |

OTHER PUBLICATIONS

Extended European Search Report, dated Sep. 13, 2018, in European Application No. 16863559.7 (6 pp.).
Chinese Office Action dated Mar. 11, 2019 in corresponding Chinese Patent Application No. 201510764970.3 ( 5 pages).
International Search Report dated Feb. 6, 2017, in corresponding International Patent Application No. PCT/CN2016/104089, 7 pgs.
Written Opinion of the International Search Authority dated Feb. 6, 2017, in corresponding International Patent Application No. PCT/CN2016/104089, 5 pgs.

* cited by examiner

INFORMATION TRANSMISSION METHOD AND APPARATUS IN TDD SYSTEM

CROSS-REFERENCE TO RELATED APPLICATIONS

This application is a continuation of International Application No. PCT/CN2016/104089, filed on Oct. 31, 2016, which claims priority to Chinese Patent Application No. 201510764970.3, filed on Nov. 11, 2015. The disclosures of the aforementioned applications are hereby incorporated by reference in their entireties.

TECHNICAL FIELD

The present disclosure relates to the communications field, and more specifically, to an information transmission method and apparatus in a TDD system.

BACKGROUND

In a Long Term Evolution (Long Term Evolution, LTE) system, to support a hybrid automatic repeat request (Hybrid Automatic Repeat Request, HARQ), user equipment needs to feed back a hybrid automatic repeat request-acknowledgement (HARQ Acknowledgment, HARQ-ACK) corresponding to a physical downlink shared channel (Physical Downlink Shared Channel, PDSCH) to a base station by using a physical uplink control channel (Physical Uplink Control Channel, PUCCH) or a physical uplink shared channel (Physical Uplink Shared Channel, PUSCH). The HARQ-ACK may be referred to as an acknowledgement (Acknowledgment, ACK) or a negative acknowledgement (Negative Acknowledgement, NACK). The user equipment needs to receive, by using a physical hybrid automatic repeat request indicator channel (Physical HARQ Indicator Channel, PHICH), a HARQ-ACK corresponding to the PUSCH.

An existing LTE system includes two types of frame structures. A first type of frame structure is used for frequency division duplex (Frequency-Division Duplex, FDD), and a second type of frame structure is used for time division duplex (Time-Division Duplex, TDD). A length of each subframe in the two types of frame structures is 1 ms.

Uplink-downlink timing indicates that if the user equipment feeds back information (usually feeds back the ACK or the NACK) in an $n^{th}$ uplink subframe, to indicate whether the user equipment correctly decodes downlink data corresponding to an $(n-k)^{th}$ downlink subframe, the uplink-downlink timing is k subframes, and may also be referred to as a timing length.

In LTE, for different uplink-downlink subframe configuration ratios, TDD has different uplink-downlink timing for each configuration ratio. Due to this complex timing relationship, protocol design is more complex, and it cannot be ensured that services have a uniform latency on an air interface.

SUMMARY

Embodiments of this application provide an information transmission method and apparatus in a TDD system, so as to provide a unified uplink-downlink timing relationship, reduce uplink-downlink switching overheads, and implement dynamic TDD.

According to a first aspect, an information transmission apparatus is provided, where the apparatus includes:

a determining unit, configured to determine a frame structure used for information transmission in a time division duplex TDD system, where each frame based on the frame structure includes N subframes, a timing length is K subframes, and one super frame includes M consecutive subframes; and a processing unit, configured to send and/or receive a message based on the frame structure, where N, K, and M are positive integers, M is a common multiple of N and 2K, each super frame includes at least one downlink-only subframe, and further includes at least one of an uplink-only subframe, a type-1 subframe, or a type-2 subframe, the downlink-only subframe includes a downlink symbol but does not include an uplink symbol, the type-1 subframe includes an uplink symbol and a downlink symbol, and a quantity of uplink symbols is less than that of downlink symbols, the type-2 subframe includes an uplink symbol and a downlink symbol, and a quantity of uplink symbols is greater than that of downlink symbols, and the uplink-only subframe includes an uplink symbol but does not include a downlink symbol.

With reference to the first aspect, in a first possible implementation, an uplink-downlink subframe configuration ratio of the super frame is 0:M, the super frame includes one downlink-only subframe: a subframe $\lfloor$SFNDL_offset/K$\rfloor$*2K+(SFNDL_offset mod K)+SFNSET_offset, and remaining subframes are type-1 subframes; and SFNSET_offset is used to represent an offset of the first subframe in a downlink subframe set of the super frame relative to the first subframe in the super frame, and a value of the offset is an integer from 0 to (K−1); SFNDL_offset is used to represent an offset of the downlink-only subframe relative to the first subframe in the downlink subframe set, and a value of the offset is an integer from 0 to (M/2−1); and the downlink subframe set is a set of subframes in the super frame that have subframe numbers m meeting a condition: $\lfloor$(m−SFNSET_offset)/K$\rfloor$ is an even number.

With reference to the first aspect, in a second possible implementation, an uplink-downlink subframe configuration ratio of the super frame is 1:1, a downlink subframe set of the super frame includes only the downlink-only subframe, and an uplink subframe set of the super frame includes only the uplink-only subframe; and the downlink subframe set is a set of subframes in the super frame that have subframe numbers m meeting a condition: $\lfloor$(m−SFNSET_offset)/K$\rfloor$ is an even number, the uplink subframe set is a set of subframes in the super frame that have subframe numbers m meeting a condition: $\lfloor$(m−SFNSET_offset)/K$\rfloor$ is an odd number, SFNSET_offset is used to represent an offset of the first subframe in the downlink subframe set of the super frame relative to the first subframe in the super frame, and a value of the offset is an integer from 0 to (K−1).

With reference to the second possible implementation of the first aspect, in a third possible implementation, the last symbol of the last downlink-only subframe in consecutive downlink-only subframes in the super frame is a GP symbol, or the first symbol of the first uplink-only subframe in consecutive uplink-only subframes in the super frame is a GP symbol, or the first symbol of the first downlink-only subframe in consecutive downlink-only subframes in the super frame is a GP symbol, or the last symbol of the last uplink-only subframe in consecutive uplink-only subframes in the super frame is a GP symbol.

With reference to the first aspect, in a fourth possible implementation, an uplink-downlink subframe configuration ratio of the super frame is a:(M−a), a downlink subframe set of the super frame includes a downlink-only subframes and (M/2−a) type-1 subframes, a subframe X in the super frame is a fixed downlink-only subframe in the a downlink-only subframes, an uplink subframe set of the super frame includes a uplink-only subframes and (M/2−a) type-1 subframes, and a subframe Y in the super frame is a fixed uplink-only subframe in the a uplink-only subframes; and 0<a<M/2, a is a positive integer, a value of X is ⌊SFND-L_offset/K⌋*2K+(SFNDL_offset mod K)+SFNSET_offset, a value of Y is (⌊SFNUL_offset/K⌋*2K+K+SFNSET_offset+(SFNUL_offset mod K)) mod M, the downlink subframe set is a set of subframes in the super frame that have subframe numbers m meeting a condition: ⌊(m−SFNSET_offset)/K⌋ is an even number, the uplink subframe set is a set of subframes in the super frame that have subframe numbers m meeting a condition: ⌊(m−SFNSET_offset)/K⌋ is an odd number, SFNSET_offset is used to represent an offset of the first subframe in the downlink subframe set of the super frame relative to the first subframe in the super frame, and a value of the offset is an integer from 0 to (K−1), SFND-L_offset is used to represent an offset of the fixed downlink-only subframe relative to the first subframe in the downlink subframe set, and a value of the offset is an integer from 0 to (M/2−1), and SFNUL_offset is used to represent an offset of the fixed uplink-only subframe relative to the first subframe that is after the first subframe in the downlink subframe set and that belongs to the uplink subframe set, and a value of the offset is an integer from 0 to (M/2−1).

With reference to the first aspect, in a fifth possible implementation, an uplink-downlink subframe configuration ratio of the super frame is a:(M−a), a downlink subframe set of the super frame includes (M−a) downlink-only subframes and (a−M/2) type-2 subframes, a subframe X in the super frame is a fixed downlink-only subframe in the (M−a) downlink-only subframes, an uplink subframe set of the super frame includes (M−a) uplink-only subframes and (a−M/2) type-2 subframes, and a subframe Y in the super frame is a fixed uplink-only subframe in the (M−a) uplink-only subframes; and M/2<a<M, a is a positive integer, a value of X is ⌊SFND-L_offset/K⌋*2K+(SFNDL_offset mod K)+SFNSET_offset, a value of Y is (⌊SFNUL_offset/K⌋*2K+K+SFNSET_offset+(SFNUL_offset mod K)) mod M, the downlink subframe set is a set of subframes in the super frame that have subframe numbers m meeting a condition: ⌊(m−SFNSET_offset)/K⌋ is an even number, the uplink subframe set is a set of subframes in the super frame that have subframe numbers m meeting a condition: ⌊(m−SFNSET_offset)/K⌋ is an odd number, SFNSET_offset is used to represent an offset of the first subframe in the downlink subframe set of the super frame relative to the first subframe in the super frame, and a value of the offset is an integer from 0 to (K−1), SFND-L_offset is used to represent an offset of the fixed downlink-only subframe relative to the first subframe in the downlink subframe set, and a value of the offset is an integer from 0 to (M/2−1), and SFNUL_offset is used to represent an offset of the fixed uplink-only subframe relative to the first subframe that is after the first subframe in the downlink subframe set and that belongs to the uplink subframe set, and a value of the offset is an integer from 0 to (M/2−1).

With reference to any one of the first aspect or the possible implementations, in a sixth possible implementation, the downlink-only subframe is used to send at least one of a physical broadcast channel PBCH, a synchronization signal, a physical hybrid automatic repeat request indicator channel PHICH, a physical downlink control channel PDCCH, an enhanced physical downlink control channel EPDCCH, or a physical control format indicator channel PCFICH.

With reference to any one of the first aspect or the possible implementations, in a seventh possible implementation, the uplink-only subframe is used to send at least one of a physical random access channel PRACH, a feedback acknowledgement ACK, a feedback negative acknowledgement NACK, channel state information CSI, or a sounding reference signal SRS.

With reference to any one of the first aspect or the possible implementations, in an eighth possible implementation, the apparatus is a base station or user equipment.

According to a second aspect, an information transmission method in a system is provided, where the method includes: determining a frame structure used for information transmission in a time division duplex TDD system, where each frame based on the frame structure includes N subframes, a timing length is K subframes, and one super frame includes M consecutive subframes; and sending and/or receiving a message based on the frame structure, where N, K, and M are positive integers, M is a common multiple of N and 2K, each super frame includes at least one downlink-only subframe, and further includes at least one of an uplink-only subframe, a type-1 subframe, or a type-2 subframe, the downlink-only subframe includes a downlink symbol but does not include an uplink symbol, the type-1 subframe includes an uplink symbol and a downlink symbol, and a quantity of uplink symbols is less than that of downlink symbols, the type-2 subframe includes an uplink symbol and a downlink symbol, and a quantity of uplink symbols is greater than that of downlink symbols, and the uplink-only subframe includes an uplink symbol but does not include a downlink symbol.

With reference to the second aspect, in a first possible implementation, an uplink-downlink subframe configuration ratio of the super frame is 0:M, the super frame includes one downlink-only subframe: a subframe ⌊SFNDL_offset/K⌋*2K+(SFNDL_offset mod K)+SFNSET_offset, and remaining subframes are type-1 subframes; and SFNSET_offset is used to represent an offset of the first subframe in a downlink subframe set of the super frame relative to the first subframe in the super frame, and a value of the offset is an integer from 0 to (K−1); SFNDL_offset is used to represent an offset of the downlink-only subframe relative to the first subframe in the downlink subframe set, and a value of the offset is an integer from 0 to (M/2−1); and the downlink subframe set is a set of subframes in the super frame that have subframe numbers m meeting a condition: ⌊(m−SFNSET_offset)/K⌋ is an even number.

With reference to the second aspect, in a second possible implementation, an uplink-downlink subframe configuration ratio of the super frame is 1:1, a downlink subframe set of the super frame includes only the downlink-only subframe, and an uplink subframe set of the super frame includes only the uplink-only subframe; and the downlink subframe set is a set of subframes in the super frame that have subframe numbers m meeting a condition: ⌊(m−SFNSET_offset)/K⌋ is an even number, the uplink subframe set is a set of subframes in the super frame that have subframe numbers m meeting a condition: ⌊(m−SFNSET_offset)/K⌋ is an odd number, SFNSET_offset is used to represent an offset of the first subframe in the downlink subframe set of the super frame relative to the first subframe in the super frame, and a value of the offset is an integer from 0 to (K−1).

With reference to the second possible implementation of the second aspect, in a third possible implementation, the last symbol of the last downlink-only subframe in consecutive downlink-only subframes in the super frame is a GP symbol, or the first symbol of the first uplink-only subframe in consecutive uplink-only subframes in the super frame is a GP symbol, or the first symbol of the first downlink-only subframe in consecutive downlink-only subframes in the super frame is a GP symbol, or the last symbol of the last uplink-only subframe in consecutive uplink-only subframes in the super frame is a GP symbol.

With reference to the second aspect, in a fourth possible implementation, an uplink-downlink subframe configuration ratio of the super frame is a:(M−a), a downlink subframe set of the super frame includes a downlink-only subframes and (M/2−a) type-1 subframes, a subframe X in the super frame is a fixed downlink-only subframe in the a downlink-only subframes, an uplink subframe set of the super frame includes a uplink-only subframes and (M/2−a) type-1 subframes, and a subframe Y in the super frame is a fixed uplink-only subframe in the a uplink-only subframes; and $0<a<M/2$, a is a positive integer, a value of X is $\lfloor SFNDL\_offset/K \rfloor *2K+(SFNDL\_offset \bmod K)+SFNSET\_offset$, a value of Y is $(\lfloor SFNUL\_offset/K \rfloor *2K+K+SFNSET\_offset+(SFNUL\_offset \bmod K)) \bmod M$, the downlink subframe set is a set of subframes in the super frame that have subframe numbers m meeting a condition: $\lfloor (m-SFNSET\_offset)/K \rfloor$ is an even number, the uplink subframe set is a set of subframes in the super frame that have subframe numbers m meeting a condition: $\lfloor (m-SFNSET\_offset)/K \rfloor$ is an odd number, SFNSET_offset is used to represent an offset of the first subframe in the downlink subframe set of the super frame relative to the first subframe in the super frame, and a value of the offset is an integer from 0 to (K−1), SFNDL_offset is used to represent an offset of the fixed downlink-only subframe relative to the first subframe in the downlink subframe set, and a value of the offset is an integer from 0 to (M/2−1), and SFNUL_offset is used to represent an offset of the fixed uplink-only subframe relative to the first subframe that is after the first subframe in the downlink subframe set and that belongs to the uplink subframe set, and a value of the offset is an integer from 0 to (M/2−1).

With reference to the second aspect, in a fifth possible implementation, an uplink-downlink subframe configuration ratio of the super frame is a:(M−a), a downlink subframe set of the super frame includes (M−a) downlink-only subframes and (a−M/2) type-2 subframes, a subframe X in the super frame is a fixed downlink-only subframe in the (M−a) downlink-only subframes, an uplink subframe set of the super frame includes (M−a) uplink-only subframes and (a−M/2) type-2 subframes, and a subframe Y in the super frame is a fixed uplink-only subframe in the (M−a) uplink-only subframes; and $M/2<a<M$, a is a positive integer, a value of X is $\lfloor SFNDL\_offset/K \rfloor *2K+(SFNDL\_offset \bmod K)+SFNSET\_offset$, a value of Y is $(\lfloor SFNUL\_offset/K \rfloor *2K+K+SFNSET\_offset+(SFNUL\_offset \bmod K)) \bmod M$, the downlink subframe set is a set of subframes in the super frame that have subframe numbers m meeting a condition: $\lfloor (m-SFNSET\_offset)/K \rfloor$ is an even number, the uplink subframe set is a set of subframes in the super frame that have subframe numbers m meeting a condition: $\lfloor (m-SFNSET\_offset)/K \rfloor$ is an odd number, SFNSET_offset is used to represent an offset of the first subframe in the downlink subframe set of the super frame relative to the first subframe in the super frame, and a value of the offset is an integer from 0 to (K−1), SFNDL_offset is used to represent an offset of the fixed downlink-only subframe relative to the first subframe in the downlink subframe set, and a value of the offset is an integer from 0 to (M/2−1), and SFNUL_offset is used to represent an offset of the fixed uplink-only subframe relative to the first subframe that is after the first subframe in the downlink subframe set and that belongs to the uplink subframe set, and a value of the offset is an integer from 0 to (M/2−1).

With reference to any one of the second aspect or the possible implementations, in a sixth possible implementation, the downlink-only subframe is used to send at least one of a physical broadcast channel PBCH, a synchronization signal, a physical hybrid automatic repeat request indicator channel PHICH, a physical downlink control channel PDCCH, an enhanced physical downlink control channel EPDCCH, or a physical control format indicator channel PCFICH.

With reference to any one of the second aspect or the possible implementations, in a seventh possible implementation, the uplink-only subframe is used to send at least one of a physical random access channel PRACH, a feedback acknowledgement ACK, a feedback negative acknowledgement NACK, channel state information CSI, or a sounding reference signal SRS.

According to the information transmission method and apparatus in the TDD system in the embodiments of this application, the downlink-only subframe, the uplink-only subframe, the type-1 subframe, and the type-2 subframe are introduced to a radio frame, the frame structure used for information transmission in the TDD system is determined, and information is sent and received based on the frame structure, so that the system can provide a unified uplink-downlink timing relationship for different uplink-downlink subframe configuration ratios, uplink-downlink switching overheads can be reduced, and dynamic TDD can be implemented.

DESCRIPTION OF EMBODIMENTS

Figure 1:
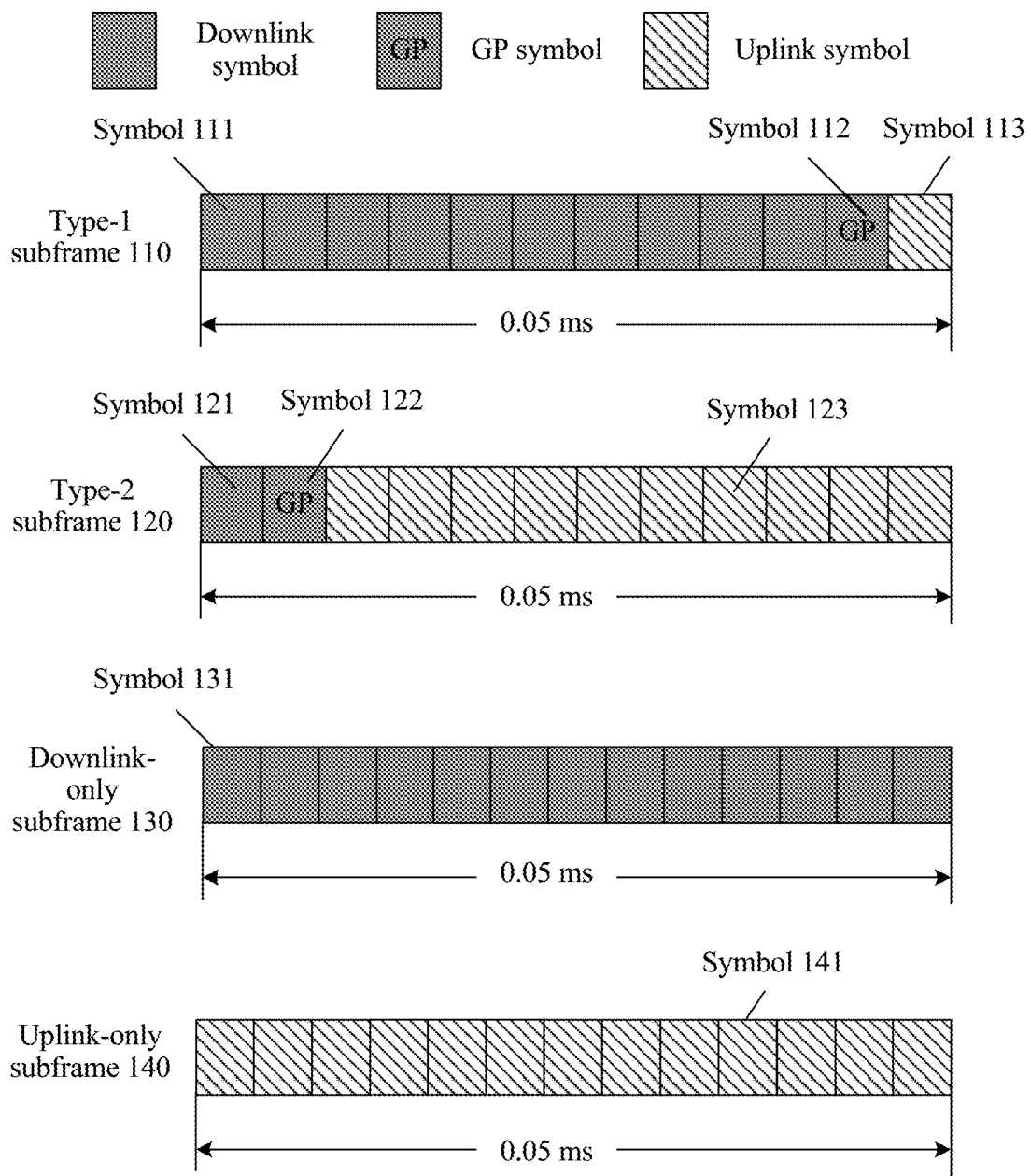
FIG. 1 is a schematic block diagram of a subframe structure.

The following describes the technical solutions of the embodiments of this application with reference to the accompanying drawings in the embodiments of this application.

The technical solutions of the embodiments of this application may be applied to various communications systems, such as a Global System for Mobile Communications (GSM, Global System of Mobile communication), a Code Division Multiple Access (CDMA, Code Division Multiple Access) system, a Wideband Code Division Multiple Access (WCDMA, Wideband Code Division Multiple Access Wireless) system, a general packet radio service (GPRS, General Packet Radio Service) system, a Long Term Evolution (LTE, Long Term Evolution) system, and a future network such as a 5G network, a D2D (device to device) network, or an M2M (machine to machine) network.

User equipment (UE, User Equipment), also referred to as a mobile terminal (Mobile Terminal), mobile user equipment, and the like, may communicate with one or more core networks by using a radio access network (for example, RAN, Radio Access Network). The user equipment may be a mobile terminal, such as a mobile phone (or referred to as a "cellular" phone) or a computer with a mobile terminal. For example, the user equipment may be a portable, pocket-sized, handheld, computer built-in, or in-vehicle mobile apparatus, and exchanges voice and/or data with the radio access network.

A base station may be a base transceiver station (BTS, Base Transceiver Station) in GSM or CDMA, or may be a NodeB (NodeB) in WCDMA, or may be an evolved NodeB (eNB or e-NodeB, evolutional Node B) in LTE, or a base station in a future network. This is not limited in the embodiments of this application. However, for ease of description, an eNB is used as an example for description in the following embodiments.

For ease of understanding the embodiments of this application, some elements used in descriptions in the embodiments of this application are first described herein.

For a time division duplex (Time Division Duplexing, TDD) system, in a mobile communications system in a TDD mode, receiving and transmission are performed in different timeslots on one frequency channel (that is, a carrier), so that a receiving channel is separated from a transmission channel by ensuring a time. Because a switch-point for time domain uplink-downlink switching may flexibly change, different uplink-downlink transmission times are set for a symmetric service (a voice, multimedia, and the like) and an asymmetric service (packet switching, the Internet, and the like), so that a radio spectrum can be fully used. In addition, there is reciprocity between an uplink channel and a downlink channel on a same frequency band. Therefore, in the TDD system, the base station can estimate a complete downlink channel by using an uplink channel of the UE, so that feedback overheads on a UE side are reduced. Both a TD-SCDMA system in 3G and a TD-LTE system in LTE are TDD systems.

L.C.M.(x, y) represents a function of a least common multiple of x and y, where both x and y are positive integers.

An uplink-downlink subframe configuration ratio is a ratio of uplink subframes to downlink subframes in a super frame.

A Floor function is a rounded-down operation function, and may be represented by a mathematical symbol $\lfloor \, \rfloor$. For example, $\mathrm{Floor}(5.5)=\lfloor 5.5 \rfloor=5$.

A Ceiling function is a rounded-up operation function, and may be represented by a mathematical symbol $\lceil \, \rceil$. For example, $\mathrm{Floor}(5.5)=\lceil 5.5 \rceil=6$.

In an LTE system, to support a hybrid automatic repeat request, the terminal needs to feed back a hybrid automatic repeat request-acknowledgement HARQ-ACK to the base station by using a physical uplink control channel (PUCCH) and a physical uplink shared channel (PUSCH). The hybrid automatic repeat request-acknowledgement may be simply referred to as an ACK (Acknowledgment, acknowledgement)/a NACK (Negative Acknowledgement, negative acknowledgement). In the LTE system, to support dynamic adaptive scheduling, the base station sends uplink resource allocation information (UL grant) by using a physical downlink control channel (PDCCH) format 0 or format 4.

In an existing system, for TDD, a HARQ-ACK corresponding to a PDSCH transmitted in a downlink subframe (n−k) is fed back in an uplink subframe n, where k belongs to a set K. A definition of K in each TDD uplink-downlink subframe configuration is shown in Table 1 and Table 2. Different uplink-downlink configurations are corresponding to different uplink-downlink configuration ratios. That is, each frame includes a different ratio of uplink subframes, special subframes, and downlink subframes. Table 1 shows an uplink-downlink periodicity switch-point and a type of each subframe in an uplink-downlink subframe configuration in the existing TDD system. D represents a downlink subframe, S represents a special subframe, and U represents an uplink subframe. Table 2 is an associated set of downlink HARQ timing of the TDD system. One uplink-downlink configuration is corresponding to one configuration ratio. If the UE feeds back information in an $n^{th}$ uplink subframe, to indicate whether the UE correctly decodes downlink data corresponding to an $(n-k)^{th}$ downlink subframe, the HARQ timing of the TDD system is k subframes. It may be learned from Table 2 that, in LTE, there is no unified timing relationship in TDD. Different uplink-downlink subframe configuration ratios have different uplink-downlink timing. Even one configuration ratio has different timing. For example, for a configuration ratio with an uplink-downlink configuration number 2, HARQ timing of a subframe 2 is 8, 7, 4, and 6. A specific meaning is that, in the subframe 2, the UE may feed back information to indicate whether downlink data corresponding to the eighth subframe (corresponding to a subframe 4 in a last subframe), the seventh subframe (corresponding to a subframe 5 in the last subframe), the fourth subframe (corresponding to a subframe 8 in the last subframe), and the sixth subframe (corresponding to a subframe 6 in the last subframe) preceding the current subframe of the UE is correctly received. If the downlink data is correctly received, the UE feeds back a corresponding ACK; or if the downlink data is not correctly received, the UE feeds back a NACK. Due to this complex timing relationship, protocol design is more complex, and it cannot be ensured that services have a uniform latency on an air interface. Therefore, in a future evolved system, for the TDD system, a unified timing relationship needs to be designed for different uplink-downlink subframe configuration ratios.

TABLE 1

Existing TDD uplink-downlink subframe configuration

| Uplink-downlink subframe configuration | Uplink-Downlink Switch-point Periodicity (Downlink-to-Uplink Switch-point periodicity) | Subframe number (Subframe number) | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

Associated set K: {$k_0, k_1, L\ k_{M-1}$} of HARQ timing in a TDD system

| Uplink-downlink configuration (UL/DL) | Subframe number (Subframe number) | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In a future evolved LTE system, to reduce a service latency, a length of each subframe may be shortened. For example, the length of each subframe is shortened to 0.05 ms, 0.1 ms, 0.125 ms, 0.2 ms, or the like. In addition, a subframe type 1, a subframe type 2, a subframe type 3, a subframe type 4, and the like are introduced. A subframe shortened in terms of time may be referred to as a short subframe or an ultra short subframe, or may be referred to as a short transmission time interval (Transmission Time Interval, TTI) or an ultra short TTI.

FIG. 1 is a schematic block diagram of a subframe structure according to an embodiment of this application. With reference to FIG. 1, a subframe structure of a short subframe is described. FIG. 1 shows a short subframe of 0.05 ms. In FIG. 1, one short subframe may include 12 symbols (for example, a type-1 subframe 110 and a type-2 subframe 120) or 13 symbols (for example, a downlink-only subframe 130 and an uplink-only subframe 140) in a time domain. The symbol may be a single carrier frequency division multiple access (Single-Carrier Frequency Division Multiple Access, SC-FDMA) symbol. Certainly, it should be understood that one subframe may include different quantities of subframes (for example, may include 11 symbols or 14 symbols or the like) in different subframe structures. A type of the symbol is not limited to the SC-FDMA symbol in the foregoing example. In addition, a subframe configuration in the file of this application is not limited to a subframe structure that includes a short subframe or an ultra short subframe.

FIG. 1 shows four subframe structure types: the type-1 subframe 110, the type-2 subframe 120, the downlink-only subframe 130, and the uplink-only subframe. The type-1 subframe 110 is mainly used for downlink transmission. For example, among 12 symbols of the type-1 subframe 110 in FIG. 1, 10 symbols 111 are used for downlink transmission, one symbol 112 is used for a guard period (Guard Period, GP), and one symbol 113 is used for uplink transmission. The type-2 subframe 120 is mainly used for uplink transmission. For example, among 12 symbols of the type-2 subframe 120 in FIG. 1, one symbol 121 is used for downlink transmission, one symbol 122 is used for a GP, and 10 symbols 123 are used for uplink transmission. The downlink-only subframe is used only for downlink transmission. For example, 13 symbols 131 of the downlink-only subframe 130 in FIG. 1 are all used for downlink transmission. The uplink-only subframe is used only for uplink transmission. For example, 13 symbols 141 of the uplink-only subframe 130 in FIG. 1 are all used for uplink transmission. Certainly, it should be understood that, the subframe structure shown in FIG. 1 is merely an example. In actual application, an uplink symbol, a downlink symbol, and a GP symbol may be configured at a plurality of different ratios in subframes of a same type that have a same length.

In a TDD system, different base stations may perform dynamic uplink-downlink subframe configuration according to an uplink-downlink subframe configuration ratio in a current cell, and this is referred to as dynamic TDD. In a dynamic TDD system, different stations can independently perform uplink-downlink configuration. As a result, uplink of a user in a neighboring cell causes strong interference to downlink of a base station of a local cell, or downlink of a base station of the neighboring cell causes strong interference to uplink of a user in the local cell. The interference is generally referred to as reverse interference. The reverse interference affects receiving and demodulation of some important signals such as a synchronization signal or important channels (such as a physical broadcast channel (Physical Broadcast Channel, PBCH) and a random access channel (Random Access Channel, RACH)), and consequently network coverage performance is decreased.

Because the type-1 subframe 110 and the type-2 subframe 120 in the subframes shown in FIG. 1 each have a GP, an effective data sending time is reduced, and system overheads are increased.

To implement a unified timing relationship for different uplink-downlink subframe configuration ratios, reduce air interface overheads, and support dynamic TDD configuration, the foregoing frame structure may be redesigned.

Figure 2:
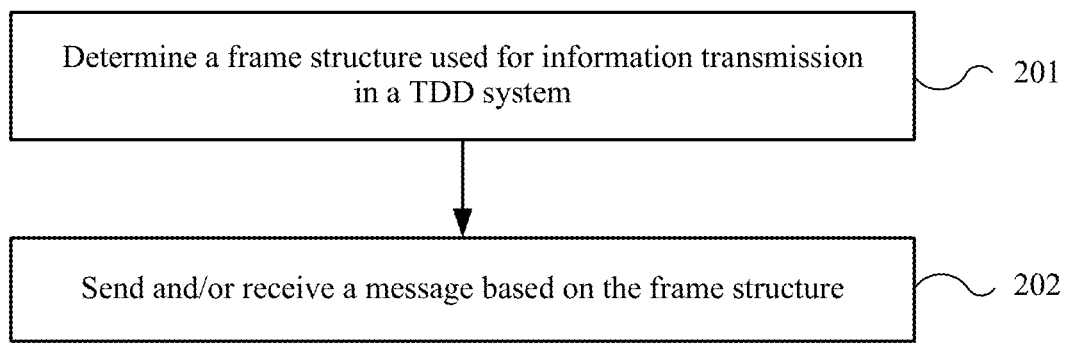
FIG. 2 is a flowchart of an information transmission method in a system according to an embodiment of this application.

FIG. 2 is a schematic diagram of an information transmission method according to an embodiment of this application. The method in FIG. 2 may be executed by a base station in a TDD system, or may be executed by user equipment. The method includes the following steps.

201. Determine a frame structure used for information transmission in a TDD system, where each frame based on the frame structure includes N subframes, a timing length is K subframes, and one super frame includes M consecutive subframes.

N, K, and M are positive integers, M is a common multiple of N and 2K, each super frame includes at least one downlink-only subframe, and further includes at least one of an uplink-only subframe, a type-1 subframe, or a type-2 subframe, the downlink-only subframe includes a downlink symbol but does not include an uplink symbol, the type-1 subframe includes an uplink symbol and a downlink symbol, and a quantity of uplink symbols is less than that of downlink symbols, the type-2 subframe includes an uplink symbol and a downlink symbol, and a quantity of uplink symbols is greater than that of downlink symbols, and the uplink-only subframe includes an uplink symbol but does not include a downlink symbol. Preferably, M is a least common multiple of N and 2K.

It should be understood that, in this embodiment of this application, a method for determining the frame structure used for information transmission in the TDD system is not limited, provided that a determined frame structure meets a requirement. For example, the frame structure may be calculated according to a frame structure calculation rule agreed on by the base station and the UE, or may be found according to a preconfigured frame structure table, or may be notified by the base station to the UE, or may be obtained by means of notification by the base station and presetting by the base station and the UE, or may be obtained in another possible implementation. To avoid repetition, details are not described herein.

In addition, it should be understood that, the downlink-only subframe may include a period (GP) symbol in addition to the downlink symbol, and the uplink-only subframe may include a period (GP) symbol in addition to the uplink symbol. For example, the last symbol of the last downlink-only subframe in consecutive downlink-only subframes in the super frame, the first symbol of the first uplink-only subframe in consecutive uplink-only subframes in the super frame, the first symbol of the first downlink-only subframe in the consecutive downlink-only subframes in the super frame, and the last symbol of the last uplink-only subframe in the consecutive uplink-only subframes in the super frame may be GP symbols. That is, a symbol that belongs to the downlink-only subframe in the super frame and that is adjacent to the uplink-only subframe is a GP symbol, or a symbol that belongs to the uplink-only subframe in the super frame and that is adjacent to the downlink-only subframe is a GP symbol.

It should be understood that, in this embodiment of this application, the timing length includes at least one of an uplink HARQ timing length, a downlink HARQ timing length, an uplink resource allocation timing length, or an aperiodic channel state information (Channel State Information, CSI) feedback timing length. When the timing length includes one timing length, the timing length is K subframes; or when the timing length includes a plurality of timing lengths, the plurality of timing lengths each are K subframes.

The uplink HARQ timing length is a required quantity of subframes between a subframe in which user equipment receives PDSCH transmission from a serving cell of the user equipment and a subframe in which the user equipment sends a corresponding hybrid repeat request acknowledgement response. For example, if a subframe in which the user equipment receives PDSCH transmission from the serving cell of the user equipment is a subframe n1, and a subframe in which the user equipment sends a corresponding hybrid repeat request acknowledgement response is a subframe (n1+k1), the uplink HARQ timing length is k1 subframes. The serving cell is a cell currently accessed by the user equipment, and the serving cell is one of at least one cell managed by the base station. This also holds true below.

The downlink HARQ timing length is a required quantity of subframes between a subframe in which a serving cell receives PUSCH transmission from user equipment in the serving cell and a subframe in which the serving cell sends a corresponding hybrid repeat request acknowledgement response. For example, if a subframe in which the serving cell receives PUSCH transmission from the user equipment in the serving cell is a subframe n2, and a subframe in which the serving cell sends a corresponding hybrid repeat request acknowledgement response is a subframe (n2+k2), the downlink HARQ timing length is k2 subframes.

The uplink resource allocation timing length is a required quantity of subframes between a subframe in which user equipment receives, from a serving cell of the user equipment, uplink resource allocation signaling that indicates the user equipment and a subframe in which the user equipment sends uplink data on an indicated resource. For example, if a subframe in which the user equipment receives, from the serving cell of the user equipment, uplink resource allocation signaling that indicates the user equipment is a subframe n3, and a subframe in which the user equipment sends uplink data on an indicated resource is a subframe (n3+k3), the uplink resource allocation timing length is k3 subframes.

The aperiodic CSI feedback timing length is a required quantity of subframes between a subframe in which user equipment receives, from a serving cell of the user equipment, a downlink control channel that instructs the user equipment to perform an aperiodic CSI feedback and a subframe in which the user equipment performs a corresponding aperiodic CSI feedback. For example, if a subframe in which the user equipment receives, from the serving cell of the user equipment, a downlink control channel that instructs the user equipment to perform an aperiodic CSI feedback is a subframe n4, and a subframe in which the user equipment performs a corresponding aperiodic CSI feedback is a subframe (n4+k4), the aperiodic CSI feedback timing length is k4 subframes.

Optionally, in an embodiment, an uplink-downlink subframe configuration ratio of the super frame is 0:M. A subframe $\lfloor SFNDL\_offset/K \rfloor *2K+(SFNDL\_offset \mod K)+SFNSET\_offset$ in the super frame is a downlink-only subframe, and remaining subframes are type-1 subframes.

SFNSET_offset is a downlink subframe set offset, and is used to represent an offset of the first subframe in a downlink subframe set of the super frame relative to the first subframe in the super frame, and a value of the offset is an integer from 0 to (K−1) (including 0 and (K−1)). SFNDL_offset is a downlink subframe offset, and is used to represent an offset of the downlink-only subframe in the downlink subframe set relative to the first subframe in the downlink subframe set, and a value of the offset is an integer from 0 to (M/2−1) (including 0 and (M/2−1)). The downlink subframe set of the super frame is a set of subframes in the super frame that have subframe numbers m meeting a condition: $\lfloor (m-SFNSET\_offset)/K \rfloor$ is an even number, where the subframe number m is an integer greater than or equal to 0. It should be understood that, in the prior art, an uplink-downlink subframe configuration ratio is a ratio of uplink subframes to downlink subframes. In this embodiment of this application, assuming that one super frame includes a uplink-only subframes, b downlink-only subframes, c type-1 subframes, and d type-2 subframes, the uplink-downlink subframe configuration ratio is equal to (a+c):(b+d).

If the uplink-downlink subframe configuration ratio (0:M), the downlink subframe set offset, and the downlink subframe offset do not change, the downlink-only subframe has a fixed location in the super frame. That is, the downlink-only subframe is a fixed downlink-only subframe.

In addition, there is a value range for the downlink subframe set offset and the downlink subframe offset. However, in a super frame structure, the downlink subframe set offset is corresponding to a specific value, and the downlink subframe offset is also corresponding to a specific value.

Figure 3:
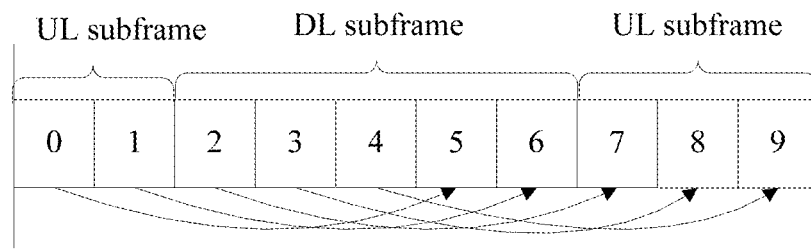
FIG. 3 is a schematic structural diagram of a frame structure according to an embodiment of this application.

FIG. 3 is a schematic structural diagram of a super frame according to an embodiment of this application. In FIG. 3, a distance between subframes corresponding to two ends of an arrow represents a timing length, and a value of the timing length K is 5. There are 10 subframes 0 to 9 in the super frame in total. A value of SFNSET_offset is 2. The subframes 2 to 6 are DL (downlink, downlink) subframes included in a downlink subframe set. The subframes 0 and 1 and the subframes 7 to 9 are UL (uplink, uplink) subframes included in an uplink subframe set. It may be learned from FIG. 3 that the subframe 2 is the first subframe in the downlink subframe set. If a value of SFNDL_offset is 1, the subframe 3 is the first downlink-only subframe in the downlink subframe set.

It may be learned from the foregoing content that, in this case, the super frame includes one downlink-only subframe and (M−1) type-1 subframes.

Definitions of the downlink subframe set and the uplink subframe set are introduced herein. In this embodiment of this application, the downlink subframe set may include a downlink-only subframe, a type-1 subframe, or a type-2 subframe, but certainly does not include an uplink-only subframe. The uplink subframe set may include an uplink-only subframe, a type-1 subframe, or a type-2 subframe, but certainly does not include a downlink-only subframe.

Optionally, in another embodiment, an uplink-downlink subframe configuration ratio of the super frame is 1:1, a downlink subframe set of the super frame includes only the downlink-only subframe, and an uplink subframe set of the super frame includes only the uplink-only subframe.

The downlink subframe set is a set of subframes in the super frame that have subframe numbers m meeting a condition: $\lfloor(m-SFNSET\_offset)/K\rfloor$ is an even number. The uplink subframe set is a set of subframes in the super frame that have subframe numbers m meeting a condition: $\lfloor(m-SFNSET\_offset)/K\rfloor$ is an odd number.

SFNSET_offset is a downlink subframe set offset, and is used to represent an offset of the first subframe in the downlink subframe set relative to the first subframe in the super frame, and a value of the offset is an integer from 0 to (K−1) (including 0 and (K−1)).

Further, the last symbol of the last downlink-only subframe in consecutive downlink-only subframes in the super frame is a GP symbol, or the first symbol of the first uplink-only subframe in consecutive uplink-only subframes in the super frame is a GP symbol, or the first symbol of the first downlink-only subframe in consecutive downlink-only subframes in the super frame is a GP symbol, or the last symbol of the last uplink-only subframe in consecutive uplink-only subframes in the super frame is a GP symbol.

It may be learned from the foregoing content that, in this case, the super frame includes M/2 downlink-only subframes and M/2 uplink-only subframes.

Optionally, in still another embodiment, an uplink-downlink subframe configuration ratio of the super frame is a:(M−a), a downlink subframe set of the super frame includes a downlink-only subframes and (M/2−a) type-1 subframes, a subframe X in the super frame is a fixed downlink-only subframe in the a downlink-only subframes, an uplink subframe set of the super frame includes a uplink-only subframes and (M/2−a) type-1 subframes, and a subframe Y in the super frame is a fixed uplink-only subframe in the a uplink-only subframes.

0<a<M/2, a is a positive integer, a value of X is $\lfloor SFNDL\_offset/K\rfloor*2K+(SFNDL\_offset \bmod K)+SFNSET\_offset$, a value of Y is $(\lfloor SFNUL\_offset/K\rfloor*2K+K+SFNSET\_offset+(SFNUL\_offset \bmod K)) \bmod M$, the downlink subframe set is a set of subframes in the super frame that have subframe numbers m meeting a condition: $\lfloor(m-SFNSET\_offset)/K\rfloor$ is an even number, and the uplink subframe set is a set of subframes in the super frame that have subframe numbers m meeting a condition: $\lfloor(m-SFNSET\_offset)/K\rfloor$ is an odd number.

SFNSET_offset is a downlink subframe set offset, and is used to represent an offset of the first subframe in the downlink subframe set relative to the first subframe in the super frame, and a value of the offset is an integer from 0 to (K−1). SFNDL_offset is a downlink subframe offset, and is used to represent an offset of the fixed downlink-only subframe relative to the first subframe in the downlink subframe set, and a value of the offset is an integer from 0 to (M/2−1). SFNUL_offset is an uplink subframe offset, and is used to represent an offset of the fixed uplink-only subframe relative to the first subframe that is after the first subframe in the downlink subframe set and that belongs to the uplink subframe set, and a value of the offset is an integer from 0 to (M/2−1).

It should be understood that, in a dynamic TDD system, if the uplink-downlink subframe configuration ratio of the super frame is a:(M−a), where a is greater than 0, and the downlink subframe set offset and the downlink subframe offset do not change, a location of the downlink-only subframe or the uplink-only subframe in the super frame may change. However, regardless of how locations of the downlink-only subframe and the uplink-only subframe change, one subframe in the uplink subframe set is certainly fixed as the uplink-only subframe, and one subframe in the downlink subframe set is certainly fixed as the downlink-only subframe. The fixed subframe in the uplink subframe set is referred to as the fixed uplink-only subframe, and the fixed subframe in the downlink subframe set is referred to as the fixed downlink-only subframe. A location of a downlink-only subframe other than the fixed downlink-only subframe and a location of an uplink-only subframe other than the fixed uplink-only subframe may change with a cell configuration. However, locations of the fixed downlink-only subframe and the fixed uplink-only subframe remain unchanged.

FIG. 3 is still used as an example. A value of a timing length K is 5, and a value of SFNSET_offset is 2. An uplink subframe set (UL subframes) is divided into two parts: subframes 0 and 1 and subframes 7, 8, and 9. The subframe 7 is the first subframe that is after the first subframe in the downlink subframe set and that belongs to the uplink subframe set. The subframes 0 and 1 are before the first subframe in the downlink subframe set, but may also be considered as the fourth and the fifth subframes after the first subframe in the downlink subframe set. If a value of SFNUL_offset is 1, the fixed uplink-only subframe is a subframe ((7+1) mod 10), that is, the subframe 8; or if a value of SFNUL_offset is 3, the fixed uplink-only subframe is a subframe ((7+3) mod 10), that is, the subframe 0.

It should be understood that if the fixed uplink-only subframe is before the first subframe that is after the first subframe in the downlink subframe set and that belongs to the uplink subframe set, for example, in FIG. 3, assuming that the fixed uplink-only subframe is the subframe 0, and is before the subframe 7 (the first subframe that is after the first subframe in the downlink subframe set and that belongs to the uplink subframe set), an offset of the subframe 0 relative to the subframe 7 is −7. However, because the value of SFNUL_offset is an integer from 0 to (M/2−1), SFNUL_offset=−7+M/2*2=−7+5*2=3.

Optionally, in still another embodiment, an uplink-downlink subframe configuration ratio of the super frame is a:(M−a), a downlink subframe set of the super frame includes (M−a) downlink-only subframes and (a−M/2) type-2 subframes, a subframe X in the super frame is a fixed downlink-only subframe in the (M−a) downlink-only subframes, an uplink subframe set of the super frame includes (M−a) uplink-only subframes and (a−M/2) type-2 subframes, and a subframe Y in the super frame is a fixed uplink-only subframe in the (M−a) uplink-only subframes.

M/2<a<M, a is a positive integer, a value of X is ⌊SFNDL_offset/K⌋*2K+(SFNDL_offset mod K)+SFNSET_offset, a value of Y is (⌊SFNUL_offset/K⌋*2K+K+SFNSET_offset+(SFNUL_offset mod K)) mod M, the downlink subframe set is a set of subframes in the super frame that have subframe numbers m meeting a condition: ⌊(m−SFNSET_offset)/K⌋ is an even number, and the uplink subframe set is a set of subframes in the super frame that have subframe numbers m meeting a condition: ⌊(m−SFNSET_offset)/K⌋ is an odd number.

SFNSET_offset is a downlink subframe set offset, and is used to represent an offset of the first subframe in the downlink subframe set relative to the first subframe in the super frame, and a value of the offset is an integer from 0 to (K−1). SFNDL_offset is a downlink subframe offset, and is used to represent an offset of the fixed downlink-only subframe relative to the first subframe in the downlink subframe set, and a value of the offset is an integer from 0 to (M/2−1). SFNUL_offset is an uplink subframe offset, and is used to represent an offset of the fixed uplink-only subframe relative to the first subframe that is after the first subframe in the downlink subframe set and that belongs to the uplink subframe set, and a value of the offset is an integer from 0 to (M/2−1).

It should be understood that, in this embodiment, locations of an uplink-only subframe and a downlink-only subframe other than the fixed uplink-only subframe and the fixed downlink-only subframe may be unfixed. However, the another uplink-only subframe certainly belongs to the uplink subframe set, and the another downlink-only subframe certainly belongs to the downlink subframe set.

202. Send and/or receive a message based on the frame structure.

It should be understood that, after the frame structure is determined, a message may be sent based on the frame structure, or a message may be received based on the frame structure, or a message may be sent and received based on the frame structure.

In an example in which the base station communicates with the user equipment, after determining the frame structure, the base station may send a message to the user equipment and/or receive a message from the user equipment based on the frame structure.

It should be understood that after determining the frame structure, the base station may notify the UE of a frame structure of a current frame, frame structures of some frames after the current frame, or a frame structure of a frame after a frame by using a broadcast message. The broadcast message includes an uplink-downlink subframe configuration. The configuration follows an uplink-downlink subframe configuration relationship in this embodiment of this application. The uplink-downlink subframe configuration mentioned herein includes configurations of the uplink-only subframe, the downlink-only subframe, the type-1 subframe, and the type-2 subframe. Alternatively, the broadcast message may include an uplink-downlink subframe configuration ratio, a downlink subframe set offset (if existent), an uplink subframe set offset (if existent), an uplink-only subframe location (if existent), a downlink-only subframe location (if existent), and the like. In addition, the base station may further notify the UE of a location of the unfixed uplink-only subframe or the unfixed downlink-only subframe mentioned in the foregoing embodiment. For example, the base station notifies the UE of a location of the unfixed uplink-only subframe by using the fixed downlink-only subframe. For specific implementation, refer to a notification manner in dynamic TDD. This is not limited herein.

Device-to-device (Device to Device, D2D) communication is used as an example. After determining the frame structure, D2D user equipment may send a message to peer D2D user equipment and/or receive a message from the peer D2D user equipment based on the frame structure.

A manner of sending, by the D2D user equipment, frame structure-based information to the peer D2D user equipment may be similar to a manner of sending, by the base station, frame structure—based information to the user equipment. Details are not described herein again in this embodiment of this application.

It should be understood that, in this embodiment of this application, the downlink-only subframe may be used to send at least one of a physical broadcast channel (Physical Broadcast Channel, PBCH), a synchronization signal, a physical hybrid automatic repeat request indicator channel (Physical Hybrid-ARQ Indicator Channel, PHICH), a physical downlink control channel (Physical Downlink Control Channel, PDCCH), an enhanced physical downlink control channel (Enhanced Physical Downlink Control Channel, EPDCCH), or a physical control format indicator channel (PCFICH Physical Control Format Indicator Channel, PCFICH).

It should be understood that, in this embodiment of this application, the uplink-only subframe is used to send at least one of a physical random access channel (Physical Random Access Channel, PRACH), a feedback acknowledgement (Acknowlegdement, ACK), a feedback negative acknowledgement (Non-Acknowlegdement, NACK), channel state information (Channel State Information, CSI), or a sounding reference signal (Sounding Reference Signal, SRS).

According to this embodiment of this application, the downlink-only subframe, the uplink-only subframe, the type-1 subframe, and the type-2 subframe are introduced to a radio frame, the frame structure used for information transmission in the TDD system is determined, and information is sent and received based on the frame structure, so that the system can provide a unified uplink-downlink timing relationship for different uplink-downlink subframe configuration ratios, uplink-downlink switching overheads can be reduced, and dynamic TDD can be implemented.

The method in the embodiments of this application is further described below with reference to FIG. 4 to FIG. 9.

Figure 4:
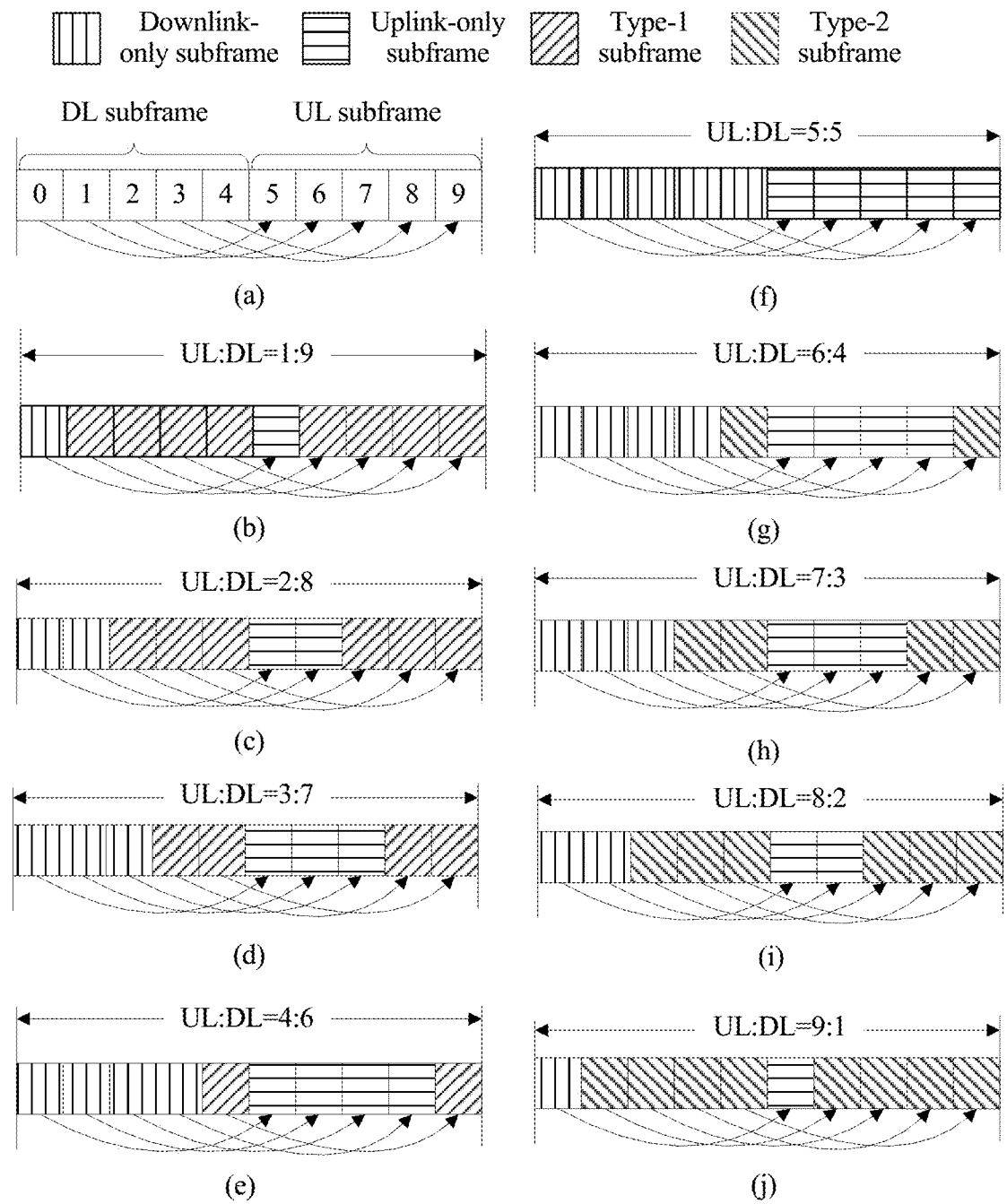
FIG. 4 is a schematic structural diagram of another frame structure according to an embodiment of this application.

FIG. 4 is a schematic diagram of a frame structure of a super frame according to an embodiment of this application. In FIG. 4, each frame includes 10 subframes, that is, N=10. A distance between subframes corresponding to two ends of an arrow represents a timing length, and the timing length is five subframes, that is, K=5. A downlink subframe set offset SFNSET_offset=0. A subframe structure includes at least one downlink-only subframe and at least one uplink-only subframe. A downlink subframe offset is 0, that is, SFNDL_offset=0. An uplink subframe offset is 0, that is, SFNUL_offset=0.

Because M=L.C.M.(10, 2*5)=10, in this case, one super frame is equal to one physical frame. (a) in FIG. 4 shows a frame structure of the super frame. Subframes in the super frame are numbered 0 to 9.

A downlink subframe set of the super frame is a set of subframes in the super frame that have subframe numbers meeting a condition: $\lfloor (m-SFNSET\_offset)/K \rfloor$ is an even number. An uplink subframe set is a set of subframes in the super frame that have subframe numbers meeting a condition: $\lfloor (m-SFNSET\_offset)/K \rfloor$ is an even number. Therefore, the downlink subframe set includes subframes {0, 1, 2, 3, 4}, and the uplink subframe set includes subframes {5, 6, 7, 8, 9}, where m is a number of a subframe in the super frame. In FIG. 4, m is a value from 0 to 9 (including 0 and 9).

In the frame structure shown in FIG. 4, there are nine uplink-downlink subframe configuration ratios: 1:9 to 9:1. There is one fixed downlink-only subframe and one fixed uplink-only subframe for each configuration ratio.

A subframe number of the fixed downlink-only subframe is $\lfloor SFNDL\_offset/K \rfloor *2K+(SFNDL\_offset \bmod K)+SFNSET\_offset=\lfloor 0/5 \rfloor *10+(0 \bmod 5)+0=0$. Therefore, the fixed downlink-only subframe is corresponding to the subframe 0.

A subframe number of the fixed uplink-only subframe is $(\lfloor SFNUL\_offset/K \rfloor *2K+K+SFNSET\_offset+(SFNUL\_offset \bmod K)) \bmod M = (\lfloor 0/5 \rfloor *10+5+0+(0 \bmod 5)) \bmod 10 = 5$. Therefore, the fixed uplink-only subframe is corresponding to the subframe 5.

As shown in (f) in FIG. 4, a frame structure with the uplink-downlink subframe configuration ratio 1:1 (that is, 5:5) includes five downlink-only subframes (subframes 0 to 4) and five uplink-only subframes (subframes 5 to 9). The last symbol of the last downlink-only subframe in consecutive downlink-only subframes in the super frame is a GP symbol, that is, the last symbol of the subframe 4 is a GP symbol; or the first symbol of the first uplink-only subframe in consecutive uplink-only subframes in the super frame is a GP symbol, that is, the first symbol of the subframe 5 is a GP symbol; or the first symbol of the first downlink-only subframe in consecutive downlink-only subframes in the super frame is a GP symbol, that is, the first symbol of the subframe 0 is a GP symbol; or the last symbol of the last uplink-only subframe in consecutive uplink-only subframes in the super frame is a GP symbol, that is, the last symbol of the subframe 9 is a GP symbol.

As shown in (b), (c), (d), and (e) in FIG. 4, a frame structure with an uplink-downlink subframe configuration ratio a:(M−a) includes a downlink-only subframes, a uplink-only subframes, and (M−2a) type-1 subframes, where 0<a<M/2, that is, a value of a is 1, 2, 3, or 4, and the uplink-downlink subframe configuration ratio of the frame structure is (1:9, 2:8, 3:7, or 4:6). The subframe 0 is the fixed downlink-only subframe, and the subframe 5 is the fixed uplink-only subframe. Remaining (a−1) downlink-only subframes are selected from subframes other than the subframe 0 in the downlink subframe set, (a−1) uplink-only subframes are selected from subframes other than the subframe 5 in the uplink subframe set, and locations of the (a−1) downlink-only subframes and the (a−1) uplink-only subframes may be unfixed. Finally remaining (M−2a) subframes are all type-1 subframes.

As shown in (g), (h), (i), and (j) in FIG. 4, a frame structure with an uplink-downlink subframe configuration ratio a:(M−a) includes (M−a) downlink-only subframes, (M−a) uplink-only subframes, and (2a−M) type-2 subframes, where M/2<a<M, that is, a value of a is 6, 7, 8, or 9, and the uplink-downlink subframe configuration ratio of the frame structure is (6:4, 7:3, 8:2, or 9:1). The subframe 0 is the fixed downlink-only subframe, and the subframe 5 is the fixed uplink-only subframe. Remaining (M−a−1) downlink-only subframes are selected from subframes other than the subframe 0 in the downlink subframe set, (M−a−1) uplink-only subframes are selected from subframes other than the subframe 5 in the uplink subframe set, and locations of the (M−a−1) downlink-only subframes and the (M−a−1) uplink-only subframes may be unfixed. Finally remaining (M−2a) subframes are all type-2 subframes.

It should be understood that, in a frame structure with the uplink-downlink subframe configuration ratio 1:9, a value of (a−1) is 0, and when the uplink-downlink subframe configuration ratio is 9:1, a value of (M−a−1) is 0. For the two uplink-downlink subframe configuration ratios, there is no uplink-only subframe other than the fixed uplink-only subframe, and there is no downlink-only subframe other than the fixed downlink-only subframe either.

Figure 5:
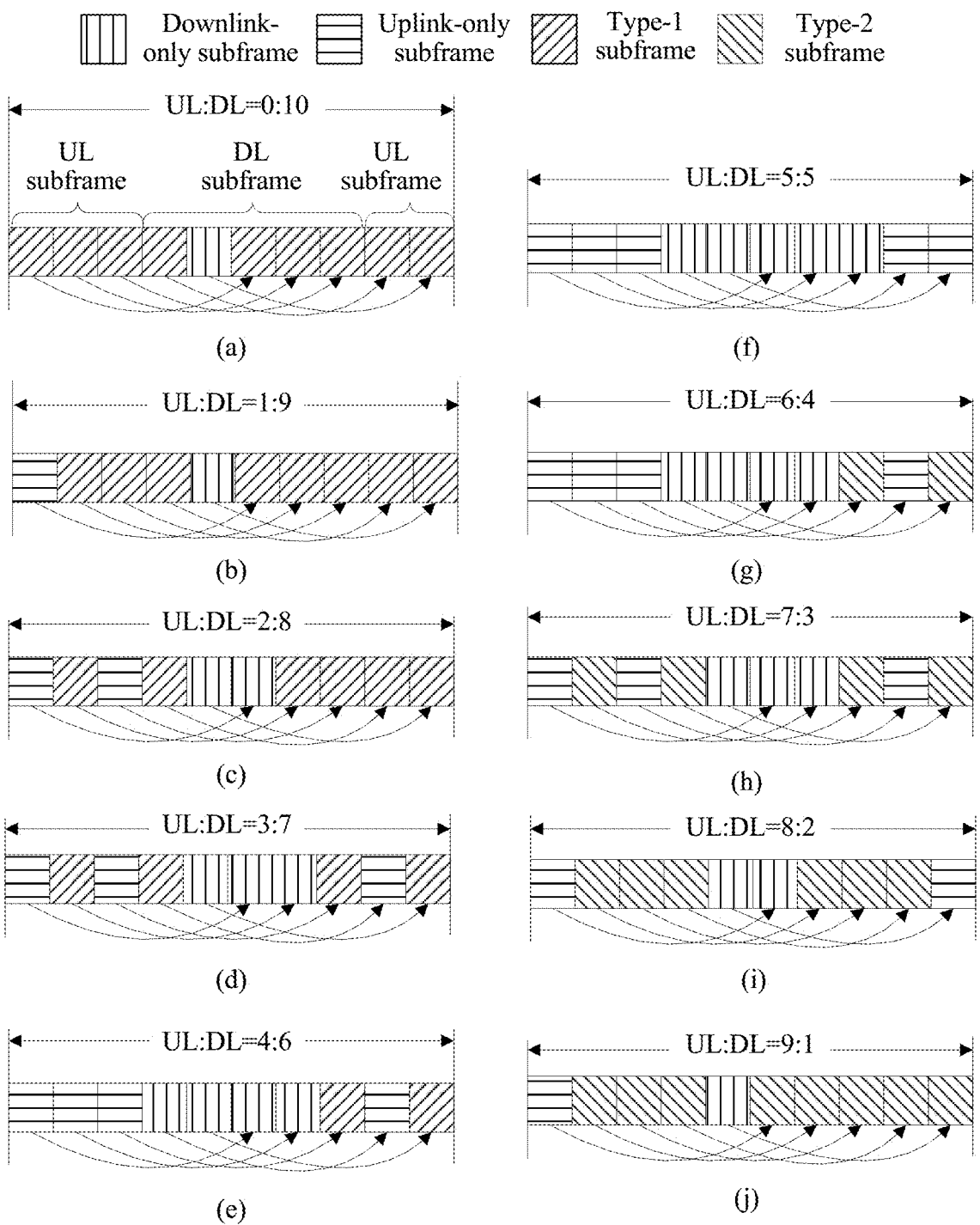
FIG. 5 is a schematic structural diagram of still another frame structure according to an embodiment of this application.

FIG. 5 is a schematic diagram of a frame structure of another super frame according to an embodiment of this application. In FIG. 5, each frame includes 10 subframes, that is, N=10. A distance between subframes corresponding to two ends of an arrow represents a timing length, and the timing length is five subframes, that is, K=5. A downlink subframe set offset SFNSET_offset=4, and a downlink subframe offset is 1, that is, SFNDL_offset=1. An uplink subframe offset is 0, that is, SFNUL_offset=0. Numbers of subframes in the super frame in this embodiment shown in FIG. 5 are still the subframe numbers in (a) in FIG. 4.

Because both a super frame length in FIG. 5 and a super frame length in FIG. 4 are 10, the subframe numbers in (a) in FIG. 4 are used as subframe numbers for each uplink-downlink subframe configuration ratio in FIG. 5.

A downlink subframe set is a set of subframes that meet a condition: $\lfloor (m-SFNSET\_offset)/K \rfloor$ is an even number, that is, the subframe set includes subframes 3 to 7.

An uplink subframe set is a set of subframes that meet a condition: $\lfloor (m-SFNSET\_offset)/K \rfloor$ is an odd number, that is, the subframe set includes subframes 0, 1, 2, 8, and 9.

In the frame structure shown in FIG. 5, (a) in FIG. 5 is corresponding to a frame structure with an uplink-downlink subframe configuration ratio 0:10, and (b) to (j) in FIG. 5 are respectively corresponding to possible implementations of uplink-downlink subframe configuration ratios 1:9 to 9:1.

As shown in (a) in FIG. 5, the frame structure with the uplink-downlink subframe configuration ratio 0:10 includes one downlink-only subframe and nine type-1 subframes. A subframe number of the downlink-only subframe is $\lfloor$SFND- L_offset/K⌋*2K+(SFNDL_offset mod K)+SFNSET_offset=⌊1/5⌋*10+(1 mod 5)+3=4. That is, the subframe 4 is the downlink-only subframe.

Frame structures shown in (b) to (j) in FIG. 5 each include one fixed downlink-only subframe and one fixed uplink-only subframe.

A subframe number of the fixed downlink-only subframe is ⌊SFNDL_offset/K⌋*2K+(SFNDL_offset mod K)+SFNSET_offset=⌊1/5⌋*10+(1 mod 5)+3=4. Therefore, the fixed downlink-only subframe is corresponding to the subframe 4.

A subframe number of the fixed uplink-only subframe is (⌊SFNUL_offset/K⌋*2K+K+SFNSET_offset+(SFNUL_offset mod K)) mod M=(⌊0/5⌋*10+5+3+(0 mod 5)) mod 10=8. Therefore, the fixed uplink-only subframe is corresponding to the subframe 8.

As shown in (f) in FIG. 5, a frame structure with the uplink-downlink subframe configuration ratio 1:1 (that is, 5:5) includes five downlink-only subframes (the subframes 3 to 7) and five uplink-only subframes (the subframes 0, 1, 2, 8, and 9). The last symbol of the subframe 7 is a GP symbol, or the first symbol of the subframe 3 is a GP symbol, or the last symbol of the subframe 2 is a GP symbol, or the first symbol of the subframe 8 is a GP symbol.

As shown in (b), (c), (d), and (e) in FIG. 5, a scenario with an uplink-downlink subframe configuration ratio a:(M−a) includes a downlink-only subframes, a uplink-only subframes, and (M−2a) type-1 subframes, where 0<a<M/2, that is, a value of a is 1, 2, 3, or 4, and the uplink-downlink subframe configuration ratio in the scenario is (1:9, 2:8, 3:7, or 4:6). The subframe 4 is the fixed downlink-only subframe, and the subframe 8 is the fixed uplink-only subframe. Remaining (a−1) downlink-only subframes are selected from subframes other than the subframe 4 in the downlink subframe set, (a−1) uplink-only subframes are selected from subframes other than the subframe 8 in the uplink subframe set, and locations of the (a−1) downlink-only subframes and the (a−1) uplink-only subframes may be unfixed. Finally remaining (M−2a) subframes are all type-1 subframes.

As shown in (g), (h), (i), and (j) in FIG. 5, a scenario with an uplink-downlink subframe configuration ratio a:(M−a) includes (M−a) downlink-only subframes, (M−a) uplink-only subframes, and (2a−M) type-2 subframes, where M/2<a<M, that is, a value of a is 6, 7, 8, or 9, and the uplink-downlink subframe configuration ratio in the scenario is (6:4, 7:3, 8:2, or 9:1). The subframe 4 is the fixed downlink-only subframe, and the subframe 8 is the fixed uplink-only subframe. Remaining (M−a−1) downlink-only subframes are selected from subframes other than the subframe 4 in the downlink subframe set, (M−a−1) uplink-only subframes are selected from subframes other than the subframe 8 in the uplink subframe set, and locations of the (M−a−1) downlink-only subframes and the (M−a−1) uplink-only subframes may be unfixed. Finally remaining (M−2a) subframes are all type-2 subframes.

It should be understood that, in a frame structure with the uplink-downlink subframe configuration ratio 1:9, a value of (a−1) is 0, and when the uplink-downlink subframe configuration ratio is 9:1, a value of (M−a−1) is 0. For the two uplink-downlink subframe configuration ratios, there is no uplink-only subframe other than the fixed uplink-only subframe, and there is no downlink-only subframe other than the fixed downlink-only subframe either.

Figure 6A:
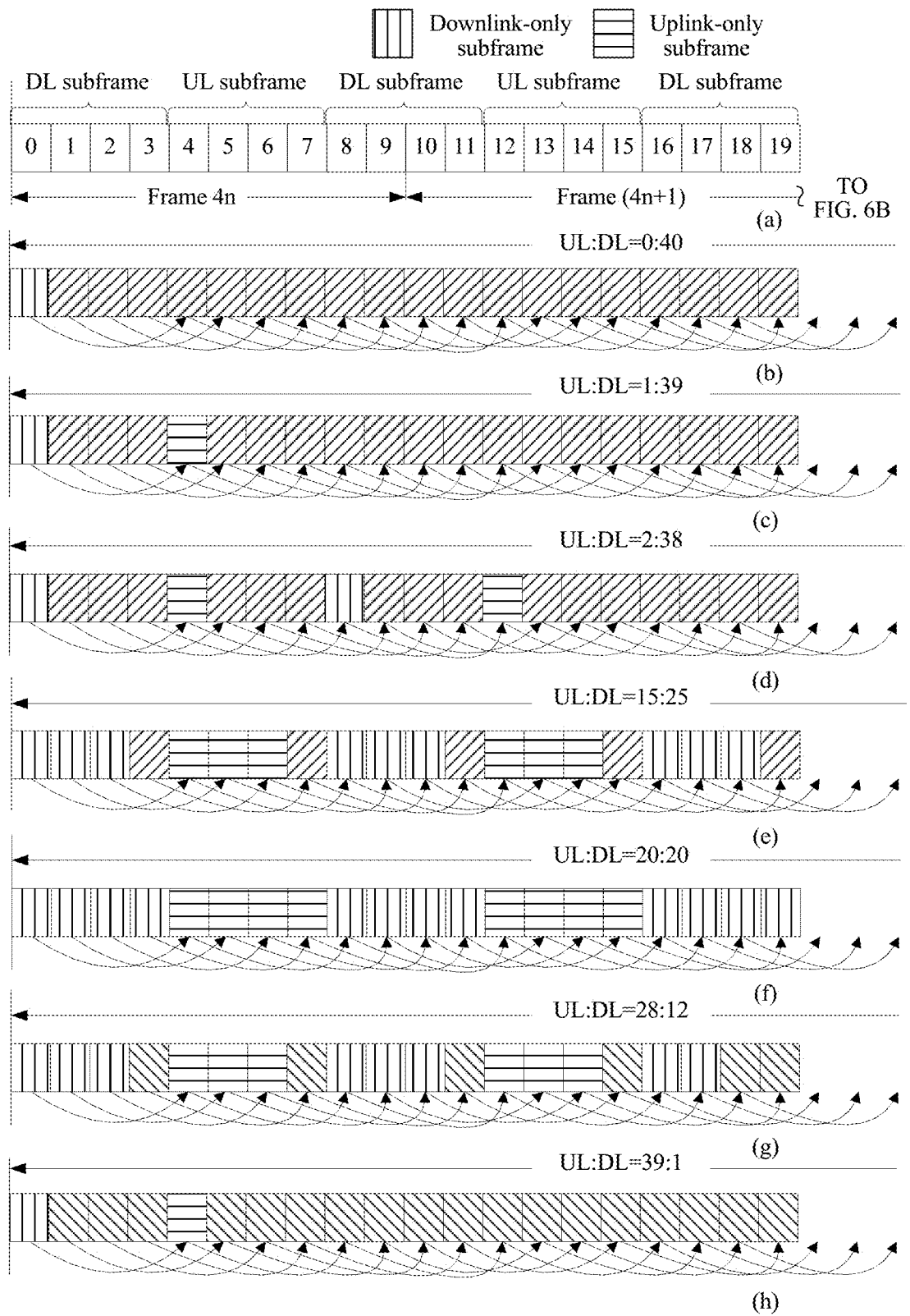
FIG. 6A and FIG. 6B are a schematic structural diagram of still another frame structure according to an embodiment of this application.
Figure 6B:
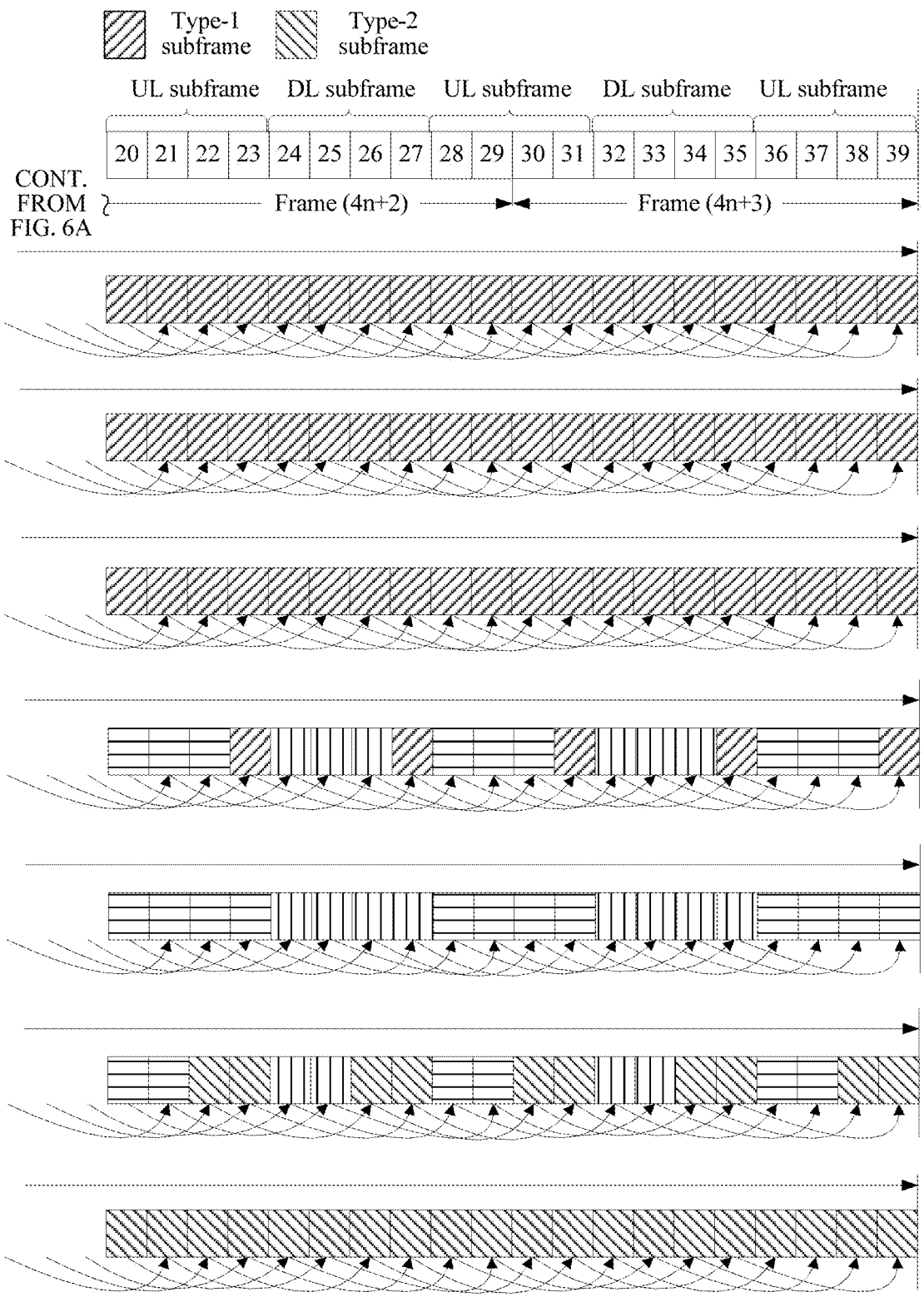

FIG. 6A and FIG. 6B are a schematic diagram of a frame structure of another super frame according to an embodiment of this application. In FIG. 6A and FIG. 6B, each frame includes 10 subframes, that is, N=10. A distance between subframes corresponding to two ends of an arrow represents a timing length, and the timing length is four subframes, that is, K=4. A downlink subframe set offset is 0 subframes, that is, SFNSET_offset=0. A downlink subframe offset is 0, that is, SFNDL_offset=0. An uplink subframe offset is 0, that is, SFNUL_offset=0.

A quantity of subframes in the super frame is M=L.C.M. (4*2, 10)=40. It is assumed that the subframes in the super frame are numbered 0 to 39. A downlink subframe set of the super frame is a set of subframes in the super frame that have numbers meeting a condition: ⌊(m−SFNSET_offset)/K⌋ is an even number. Therefore, the downlink subframe set is {0, 1, 2, 3, 8, 9, 10, 11, 16, 17, 18, 19, 24, 25, 26, 27, 32, 33, 34, 35}, and an uplink subframe set is {4, 5, 6, 7, 12, 13, 14, 15, 20, 21, 22, 23, 28, 29, 30, 31, 36, 37, 38, 39}.

In the frame structure shown in FIG. 6A and FIG. 6B, (b) in FIG. 6A and FIG. 6B is corresponding to a frame structure with an uplink-downlink subframe configuration ratio 0:40, and (c) to (h) in FIG. 6A and FIG. 6B are respectively corresponding to possible implementations of uplink-downlink subframe configuration ratios 1:39, 2:38, 15:25, 20:20, 28:12, and 39:1.

As shown in (b) in FIG. 6A and FIG. 6B, the frame structure with the uplink-downlink subframe configuration ratio 0:40 includes one downlink-only subframe and 39 type-1 subframes. A subframe number of the downlink-only subframe is ⌊SFNDL_offset/K⌋*2K+(SFNDL_offset mod K)+SFNSET_offset=⌊0/4⌋*8+(0 mod 4)+0=0. That is, a subframe 0 is the downlink-only subframe.

Frame structures shown in (c) to (h) in FIG. 6A and FIG. 6B each include one fixed downlink-only subframe and one fixed uplink-only subframe.

A subframe number of the fixed downlink-only subframe is ⌊SFNDL_offset/K⌋*2K+(SFNDL_offset mod K)+SFNSET_offset=⌊0/4⌋*8+(0 mod 4)+0=0. Therefore, the fixed downlink-only subframe is corresponding to the subframe 0.

A subframe number of the fixed uplink-only subframe is (⌊SFNUL_offset/K⌋*2K+K+SFNSET_offset+(SFNUL_offset mod K)) mod M=(⌊0/4⌋*8+4+0+(0 mod 4)) mod 40=4. Therefore, the fixed uplink-only subframe is corresponding to a subframe 4.

As shown in (f) in FIG. 6A and FIG. 6B, a frame structure with the uplink-downlink subframe configuration ratio 1:1 (that is, 20:20) includes 20 downlink-only subframes and 20 uplink-only subframes. The specific frame structure is shown in (f) in FIG. 6A and FIG. 6B. For a location of a GP symbol, refer to the example of the frame structure shown in (f) in FIG. 4. Details are not described herein again in this embodiment of this application.

As shown in (c), (d), and (e) in FIG. 6A and FIG. 6B, a scenario with an uplink-downlink subframe configuration ratio a:(M−a) includes a downlink-only subframes, a uplink-only subframes, and (M−2a) type-1 subframes, where 0<a<M/2, that is, a value of a is 1, 2, or 15, and the uplink-downlink subframe configuration ratio in the scenario is (1:39, 2:38, or 15:25). The subframe 0 is the fixed downlink-only subframe, and the subframe 4 is the fixed uplink-only subframe. Remaining (a−1) downlink-only subframes are selected from subframes other than the subframe 0 in the downlink subframe set, (a−1) uplink-only subframes are selected from subframes other than the subframe 4 in the uplink subframe set, and locations of the (a−1) downlink-only subframes and the (a−1) uplink-only subframes may be unfixed. Finally remaining (M−2a) subframes are all type-1 subframes.

As shown in (g) and (h) in FIG. 6A and FIG. 6B, a scenario with an uplink-downlink subframe configuration ratio a:(M−a) includes (M−a) downlink-only subframes, (M−a) uplink-only subframes, and (2a−M) type-2 subframes, where M/2<a<M, that is, a value of a is 28 or 39, and the uplink-downlink subframe configuration ratio in the scenario is (28:12 or 39:1). The subframe 0 is the fixed downlink-only subframe, and the subframe 4 is the fixed uplink-only subframe. Remaining (M−a−1) downlink-only subframes are selected from subframes other than the subframe 0 in the downlink subframe set, (M−a−1) uplink-only subframes are selected from subframes other than the subframe 4 in the uplink subframe set, and locations of the (M−a−1) downlink-only subframes and the (M−a−1) uplink-only subframes may be unfixed. Finally remaining (M−2a) subframes are all type-2 subframes.

It should be understood that, in a frame structure with the uplink-downlink subframe configuration ratio 1:39, a value of (a−1) is 0, and when the uplink-downlink subframe configuration ratio is 39:1, a value of (M−a−1) is 0. For the two uplink-downlink subframe configuration ratios, there is no uplink-only subframe other than the fixed uplink-only subframe, and there is no downlink-only subframe other than the fixed downlink-only subframe either.

Figure 7A:
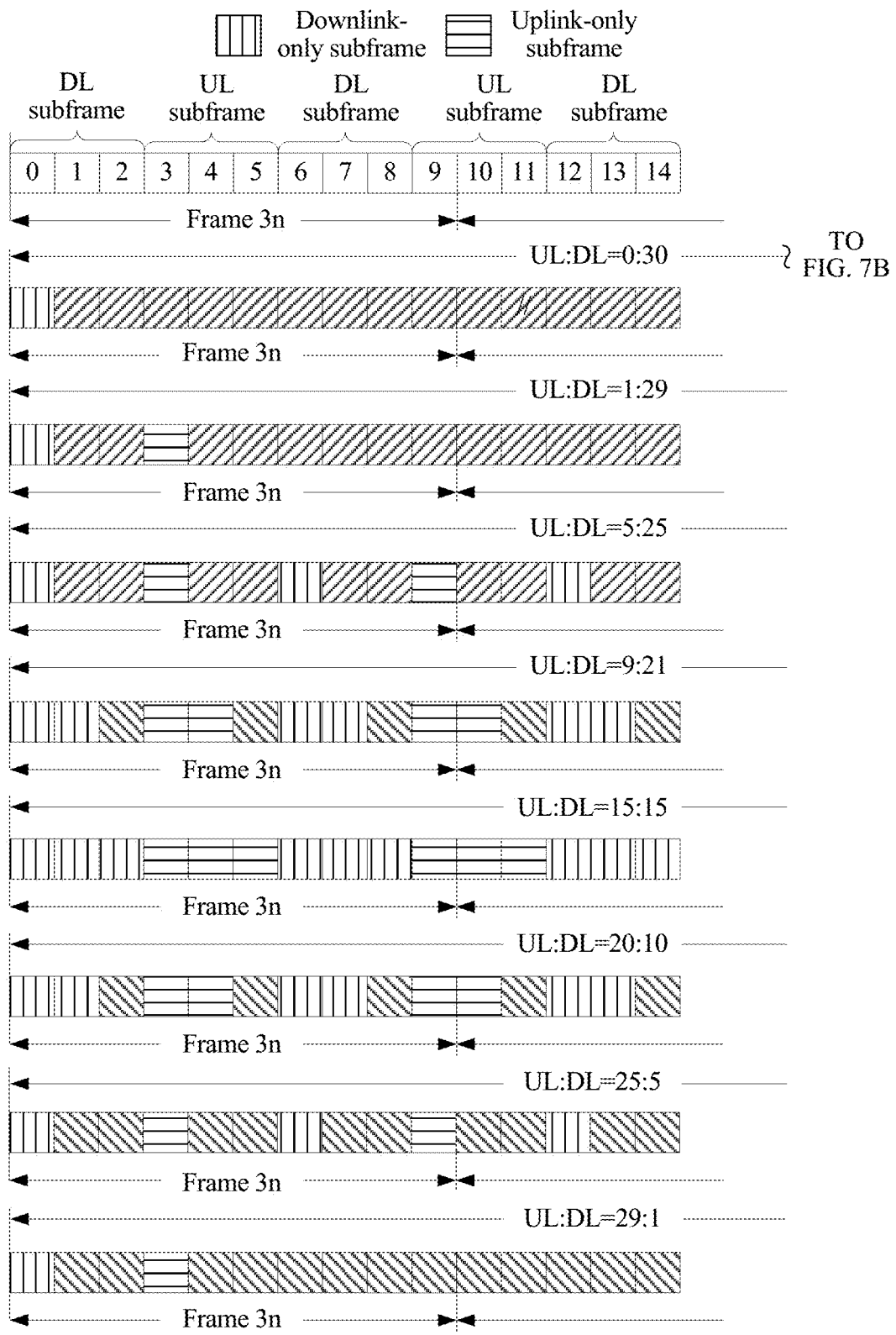
FIG. 7A and FIG. 7B are a schematic structural diagram of still another frame structure according to an embodiment of this application.
Figure 7B:
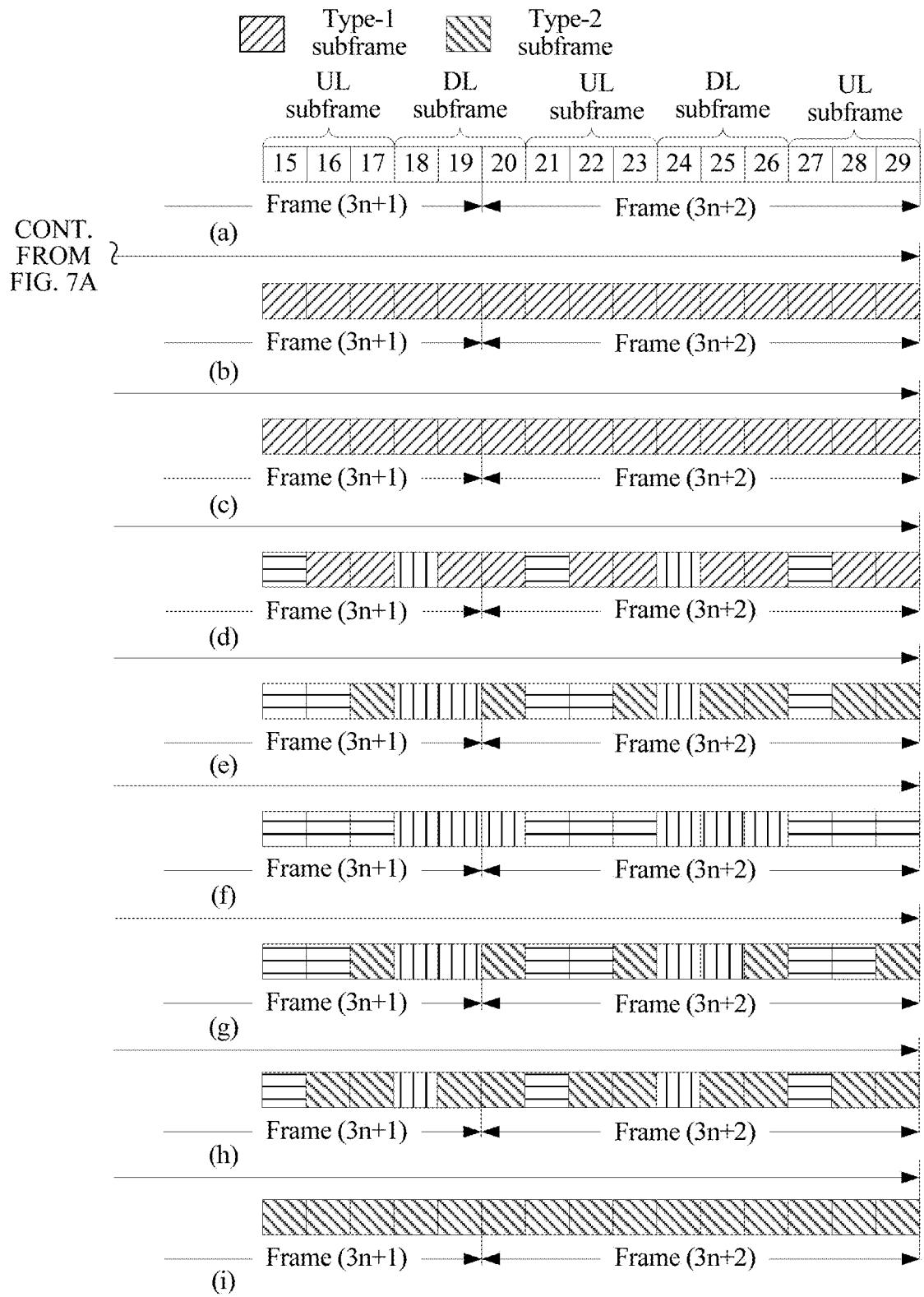

FIG. 7A and FIG. 7B are a schematic diagram of a frame structure of still another super frame according to an embodiment of this application. In FIG. 7A and FIG. 7B, each frame includes 10 subframes, that is, N=10. A distance between subframes corresponding to two ends of an arrow represents a timing length, and the timing length is three subframes, that is, K=3. A downlink subframe set offset is 0 subframes, that is, SFNSET_offset=0. A downlink subframe offset is 0, that is, SFNDL_offset=0. An uplink subframe offset is 0, that is, SFNUL_offset=0.

A quantity of subframes in the super frame is M=L.C.M. (3*2, 10)=30. It is assumed that the subframes in the super frame are numbered 0 to 29. As shown in (a) in FIG. 7A and FIG. 7B, a downlink subframe set is {0, 1, 2, 6, 7, 8, 12, 13, 14, 18, 19, 20, 24, 25, 26}, and an uplink subframe set is {3, 4, 5, 9, 10, 11, 15, 16, 17, 21, 22, 23, 27, 28, 29}.

In the frame structure shown in FIG. 7A and FIG. 7B, (b) in FIG. 7A and FIG. 7B is corresponding to a frame structure with an uplink-downlink subframe configuration ratio 0:30, and (c) to (i) in FIG. 7A and FIG. 7B are respectively corresponding to possible implementations of uplink-downlink subframe configuration ratios 1:29, 5:25, 9:21, 15:15, 20:10, 25:5, and 29:1.

As shown in (b) in FIG. 7A and FIG. 7B, the frame structure with the uplink-downlink subframe configuration ratio 0:30 includes one downlink-only subframe and 29 type-1 subframes. A subframe number of the downlink-only subframe is $\lfloor SFNDL\_offset/K \rfloor *2K+(SFNDL\_offset \bmod K)+SFNSET\_offset=\lfloor 0/3 \rfloor *6+(0 \bmod 3)+0=0$. That is, a subframe 0 is the downlink-only subframe.

Frame structures shown in (c) to (i) in FIG. 7A and FIG. 7B each include one fixed downlink-only subframe and one fixed uplink-only subframe.

A subframe number of the fixed downlink-only subframe is $\lfloor SFNDL\_offset/K \rfloor *2K+(SFNDL\_offset \bmod K)+SFNSET\_offset=\lfloor 0/3 \rfloor *6+(0 \bmod 3)+0=0$. Therefore, the fixed downlink-only subframe is corresponding to the subframe 0.

A subframe number of the fixed uplink-only subframe is $(\lfloor SFNUL\_offset/K \rfloor *2K+K+SFNSET\_offset+(SFNUL\_offset \bmod K)) \bmod M=(\lfloor 0/3 \rfloor *6+3+0+(0 \bmod 3)) \bmod 30=3$. Therefore, the fixed uplink-only subframe is corresponding to a subframe 3.

As shown in (f) in FIG. 7A and FIG. 7B, a frame structure with the uplink-downlink subframe configuration ratio 1:1 (that is, 15:15) includes 15 downlink-only subframes and 15 uplink-only subframes. The specific frame structure is shown in (f) in FIG. 7A and FIG. 7B. For a location of a GP symbol, refer to the example of the frame structure shown in (f) in FIG. 4. Details are not described herein again in this embodiment of this application.

As shown in (c), (d), and (e) in FIG. 7A and FIG. 7B, a scenario with an uplink-downlink subframe configuration ratio a:(M−a) includes a downlink-only subframes, a uplink-only subframes, and (M−2a) type-1 subframes, where 0<a<M/2, that is, a value of a is 1, 5, or 9, and the uplink-downlink subframe configuration ratio in the scenario is (1:29, 5:25, or 9:21). The subframe 0 is the fixed downlink-only subframe, and the subframe 3 is the fixed uplink-only subframe. Remaining (a−1) downlink-only subframes are selected from subframes other than the subframe 0 in the downlink subframe set, (a−1) uplink-only subframes are selected from subframes other than the subframe 3 in the uplink subframe set, and locations of the (a−1) downlink-only subframes and the (a−1) uplink-only subframes may be unfixed. Finally remaining (M−2a) subframes are all type-1 subframes.

As shown in (g) and (h) in FIG. 7A and FIG. 7B, a scenario with an uplink-downlink subframe configuration ratio a:(M−a) includes (M−a) downlink-only subframes, (M−a) uplink-only subframes, and (2a−M) type-2 subframes, where M/2<a<M, that is, a value of a is 20, 25, or 39, and the uplink-downlink subframe configuration ratio in the scenario is (20:10, 25:5, or 29:1). The subframe 0 is the fixed downlink-only subframe, and a subframe 4 is the fixed uplink-only subframe. Remaining (M−a−1) downlink-only subframes are selected from subframes other than the subframe 0 in the downlink subframe set, (M−a−1) uplink-only subframes are selected from subframes other than the subframe 4 in the uplink subframe set, and locations of the (M−a−1) downlink-only subframes and the (M−a−1) uplink-only subframes may be unfixed. Finally remaining (M−2a) subframes are all type-2 subframes.

It should be understood that, in a frame structure with the uplink-downlink subframe configuration ratio 1:29, a value of (a−1) is 0, and when the uplink-downlink subframe configuration ratio is 29:1, a value of (M−a−1) is 0. For the two uplink-downlink subframe configuration ratios, there is no uplink-only subframe other than the fixed uplink-only subframe, and there is no downlink-only subframe other than the fixed downlink-only subframe either.

Figure 8:
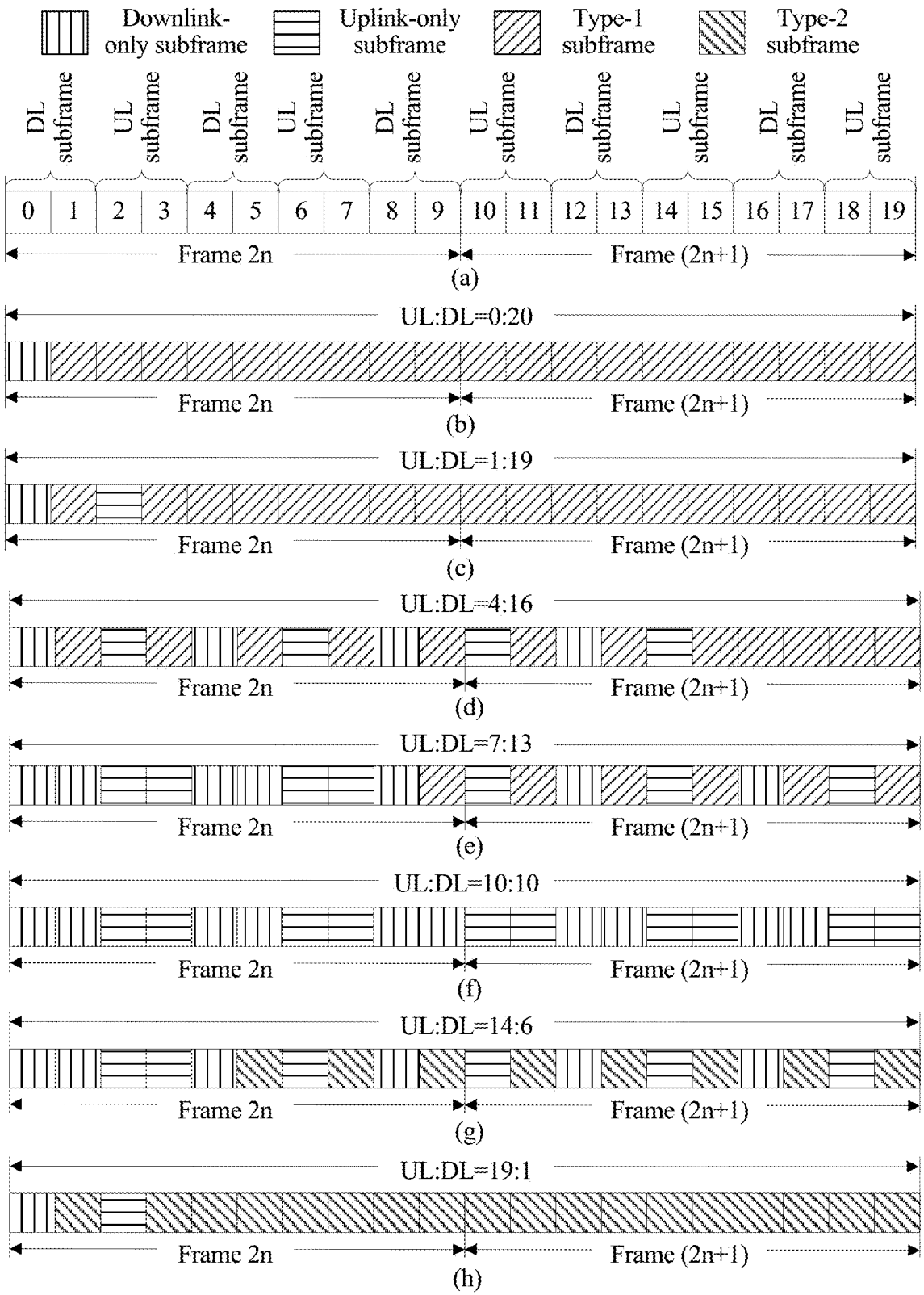
FIG. 8 is a schematic structural diagram of still another frame structure according to an embodiment of this application.

FIG. 8 is a schematic diagram of a frame structure of still another super frame according to an embodiment of this application. In FIG. 8, each frame includes 10 subframes, that is, N=10. A distance between subframes corresponding to two ends of an arrow represents a timing length, and the timing length is two subframes, that is, K=2. A downlink subframe set offset is 0 subframes, that is, SFNSET_offset=0. A downlink subframe offset is 0, that is, SFNDL_offset=0. An uplink subframe offset is 0, that is, SFNUL_offset=0.

A quantity of subframes in the super frame is M=L.C.M. (2*2, 10)=20. It is assumed that the subframes in the super frame are numbered 0 to 19. As shown in (a) in FIG. 8, a downlink subframe set is {0, 1, 4, 5, 8, 9, 12, 13, 16, 17}, and an uplink subframe set is {2, 3, 6, 7, 10, 11, 14, 15, 18, 19}.

In the frame structure shown in FIG. 8, (b) in FIG. 8 is corresponding to a frame structure with an uplink-downlink subframe configuration ratio 0:20, and (c) to (h) in FIG. 8 are respectively corresponding to possible implementations of uplink-downlink subframe configuration ratios 1:19, 4:16, 7:13, 10:10, 14:6, and 19:1.

As shown in (b) in FIG. 8, the frame structure with the uplink-downlink subframe configuration ratio 0:20 includes one downlink-only subframe and 19 type-1 subframes. A subframe number of the downlink-only subframe is ⌊SFNDL_offset/K⌋*2K+(SFNDL_offset mod K)+SFNSET_offset=⌊0/3⌋*6+(0 mod 3)+0=0. That is, a subframe 0 is the downlink-only subframe.

Frame structures shown in (c) to (h) in FIG. 8 each include one fixed downlink-only subframe and one fixed uplink-only subframe.

A subframe number of the fixed downlink-only subframe is ⌊SFNDL_offset/K⌋*2K+(SFNDL_offset mod K)+SFNSET_offset=⌊0/3⌋*6+(0 mod 3)+0=0. Therefore, the fixed downlink-only subframe is corresponding to the subframe 0.

A subframe number of the fixed uplink-only subframe is (⌊SFNUL_offset/K⌋*2K+K+SFNSET_offset+(SFNUL_offset mod K)) mod M=(⌊0/3⌋*6+3+0+(0 mod 3)) mod 20=3. Therefore, the fixed uplink-only subframe is corresponding to a subframe 3.

As shown in (f) in FIG. 8, a frame structure with the uplink-downlink subframe configuration ratio 1:1 (that is, 10:10) includes 10 downlink-only subframes and 10 uplink-only subframes. The specific frame structure is shown in (f) in FIG. 8. For a location of a GP symbol, refer to the example of the frame structure shown in (f) in FIG. 4. Details are not described herein again in this embodiment of this application.

As shown in (c), (d), and (e) in FIG. 8, a scenario with an uplink-downlink subframe configuration ratio a:(M−a) includes a downlink-only subframes, a uplink-only subframes, and (M−2a) type-1 subframes, where 0<a<M/2, that is, a value of a is 1, 4, or 7, and the uplink-downlink subframe configuration ratio in the scenario is (1:19, 4:16, or 7:13). The subframe 0 is the fixed downlink-only subframe, and the subframe 3 is the fixed uplink-only subframe. Remaining (a−1) downlink-only subframes are selected from subframes other than the subframe 0 in the downlink subframe set, (a−1) uplink-only subframes are selected from subframes other than the subframe 3 in the uplink subframe set, and locations of the (a−1) downlink-only subframes and the (a−1) uplink-only subframes may be unfixed. Finally remaining (M−2a) subframes are all type-1 subframes.

As shown in (g) and (h) in FIG. 8, a scenario with an uplink-downlink subframe configuration ratio a:(M−a) includes (M−a) downlink-only subframes, (M−a) uplink-only subframes, and (2a−M) type-2 subframes, where M/2<a<M, that is, a value of a is 14 or 19, and the uplink-downlink subframe configuration ratio in the scenario is (14:6 or 19:1). The subframe 0 is the fixed downlink-only subframe, and a subframe 4 is the fixed uplink-only subframe. Remaining (M−a−1) downlink-only subframes are selected from subframes other than the subframe 0 in the downlink subframe set, (M−a−1) uplink-only subframes are selected from subframes other than the subframe 4 in the uplink subframe set, and locations of the (M−a−1) downlink-only subframes and the (M−a−1) uplink-only subframes may be unfixed. Finally remaining (M−2a) subframes are all type-2 subframes.

It should be understood that, in a frame structure with the uplink-downlink subframe configuration ratio 1:19, a value of (a−1) is 0, and when the uplink-downlink subframe configuration ratio is 19:1, a value of (M−a−1) is 0. For the two uplink-downlink subframe configuration ratios, there is no uplink-only subframe other than the fixed uplink-only subframe, and there is no downlink-only subframe other than the fixed downlink-only subframe either.

Figure 9:
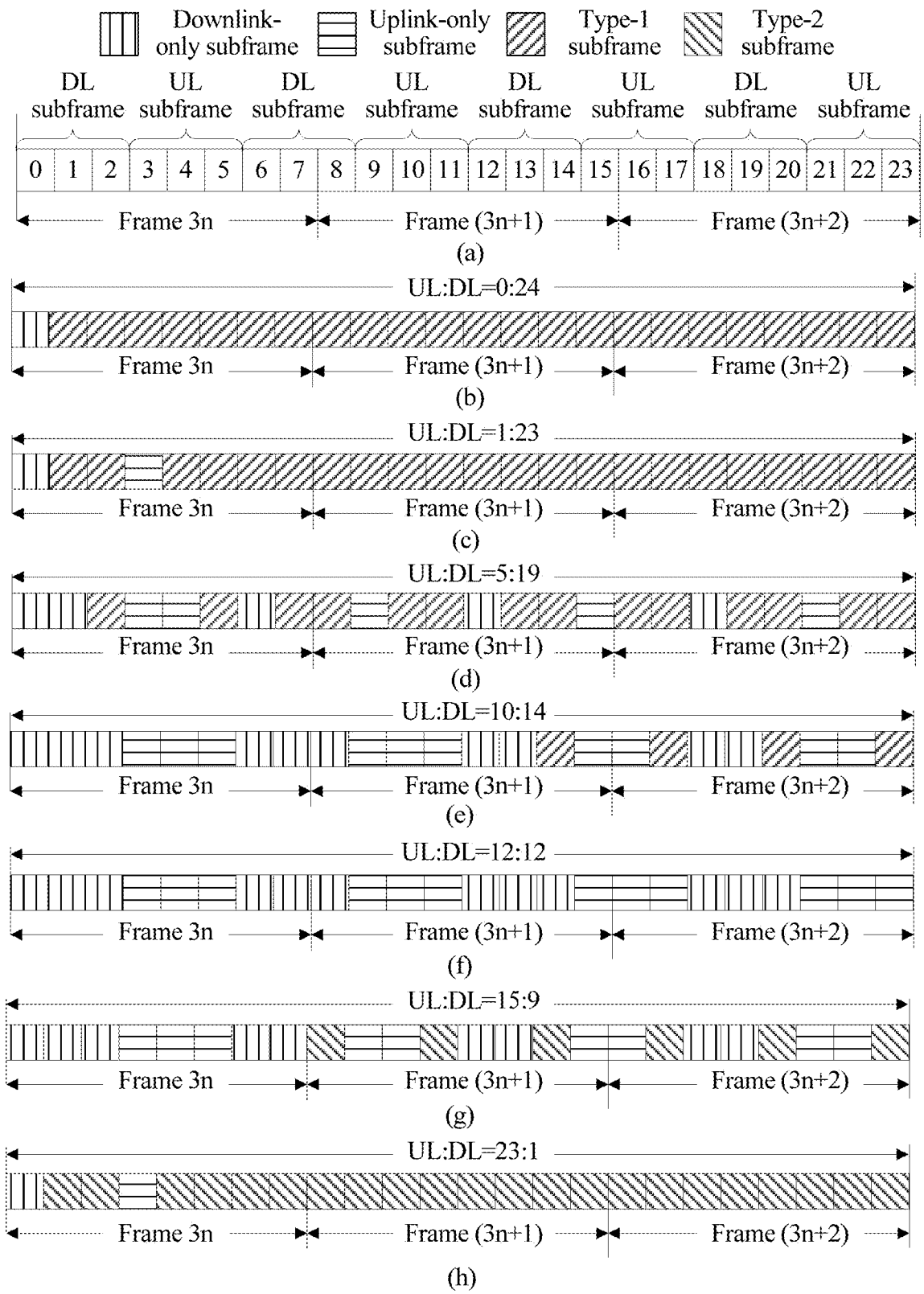
FIG. 9 is a schematic structural diagram of still another frame structure according to an embodiment of this application.

FIG. 9 is a schematic diagram of a frame structure of still another super frame according to an embodiment of this application. In FIG. 9, each frame includes eight subframes, that is, N=8. A distance between subframes corresponding to two ends of an arrow represents a timing length, and the timing length is three subframes, that is, K=3. A downlink subframe set offset is 0 subframes, that is, SFNSET_offset=0. A downlink subframe offset is 0, that is, SFNDL_offset=0. An uplink subframe offset is 0, that is, SFNUL_offset=0.

A quantity of subframes in the super frame is M=L.C.M.(3*2, 8)=24. It is assumed that the subframes in the super frame are numbered 0 to 23. As shown in (a) in FIG. 9, a downlink subframe set is {0, 1, 2, 6, 7, 8, 12, 13, 14, 18, 19, 20}, and an uplink subframe set is {3, 4, 5, 9, 10, 11, 15, 16, 17, 21, 22, 23}.

In the frame structure shown in FIG. 9, (b) in FIG. 9 is corresponding to a frame structure with an uplink-downlink subframe configuration ratio 0:24, and (c) to (h) in FIG. 9 are respectively corresponding to possible implementations of uplink-downlink subframe configuration ratios 1:23, 5:19, 10:14, 12:12, 15:9, and 23:1.

As shown in (b) in FIG. 9, the frame structure with the uplink-downlink subframe configuration ratio 0:24 includes one downlink-only subframe and 23 type-1 subframes. A subframe number of the downlink-only subframe is ⌊SFNDL_offset/K⌋*2K+(SFNDL_offset mod K)+SFNSET_offset=⌊0/3⌋*6+(0 mod 3)+0=0. That is, a subframe 0 is the downlink-only subframe.

Frame structures shown in (c) to (h) in FIG. 9 each include one fixed downlink-only subframe and one fixed uplink-only subframe.

A subframe number of the fixed downlink-only subframe is ⌊SFNDL_offset/K⌋*2K+(SFNDL_offset mod K)+SFNSET_offset=⌊0/3⌋*6+(0 mod 3)+0=0. Therefore, the fixed downlink-only subframe is corresponding to the subframe 0.

A subframe number of the fixed uplink-only subframe is (⌊SFNUL_offset/K⌋*2K+K+SFNSET_offset+(SFNUL_offset mod K)) mod M=(⌊0/3⌋*6+3+0+(0 mod 3)) mod 24=3. Therefore, the fixed uplink-only subframe is corresponding to a subframe 3.

As shown in (f) in FIG. 9, a frame structure with the uplink-downlink subframe configuration ratio 1:1 (that is, 12:12) includes 12 downlink-only subframes and 12 uplink-only subframes. The specific frame structure is shown in (f) in FIG. 9. For a location of a GP symbol, refer to the example of the frame structure shown in (f) in FIG. 4. Details are not described herein again in this embodiment of this application.

As shown in (c), (d), and (e) in FIG. 9, a scenario with an uplink-downlink subframe configuration ratio a:(M−a) includes a downlink-only subframes, a uplink-only subframes, and (M−2a) type-1 subframes, where 0<a<M/2, that is, a value of a is 1, 5, or 10, and the uplink-downlink subframe configuration ratio in the scenario is (1:23, 5:19, or 10:14). The subframe 0 is the fixed downlink-only subframe, and the subframe 3 is the fixed uplink-only subframe. Remaining (a−1) downlink-only subframes are selected from subframes other than the subframe 0 in the downlink subframe set, (a−1) uplink-only subframes are selected from subframes other than the subframe 3 in the uplink subframe set, and locations of the (a−1) downlink-only subframes and the (a−1) uplink-only subframes may be unfixed. Finally remaining (M−2a) subframes are all type-1 subframes.

As shown in (g) and (h) in FIG. 9, a scenario with an uplink-downlink subframe configuration ratio a:(M−a) includes (M−a) downlink-only subframes, (M−a) uplink-only subframes, and (2a−M) type-2 subframes, where M/2<a<M, that is, a value of a is 15 or 23, and the uplink-downlink subframe configuration ratio in the scenario is (15:9 or 23:1). The subframe 0 is the fixed downlink-only subframe, and a subframe 4 is the fixed uplink-only subframe. Remaining (M−a−1) downlink-only subframes are selected from subframes other than the subframe 0 in the downlink subframe set, (M−a−1) uplink-only subframes are selected from subframes other than the subframe 4 in the uplink subframe set, and locations of the (M−a−1) downlink-only subframes and the (M−a−1) uplink-only subframes may be unfixed. Finally remaining (M−2a) subframes are all type-2 subframes.

It should be understood that, in a frame structure with the uplink-downlink subframe configuration ratio 1:23, a value of (a−1) is 0, and when the uplink-downlink subframe configuration ratio is 23:1, a value of (M−a−1) is 0. For the two uplink-downlink subframe configuration ratios, there is no uplink-only subframe other than the fixed uplink-only subframe, and there is no downlink-only subframe other than the fixed downlink-only subframe either.

Figure 10:
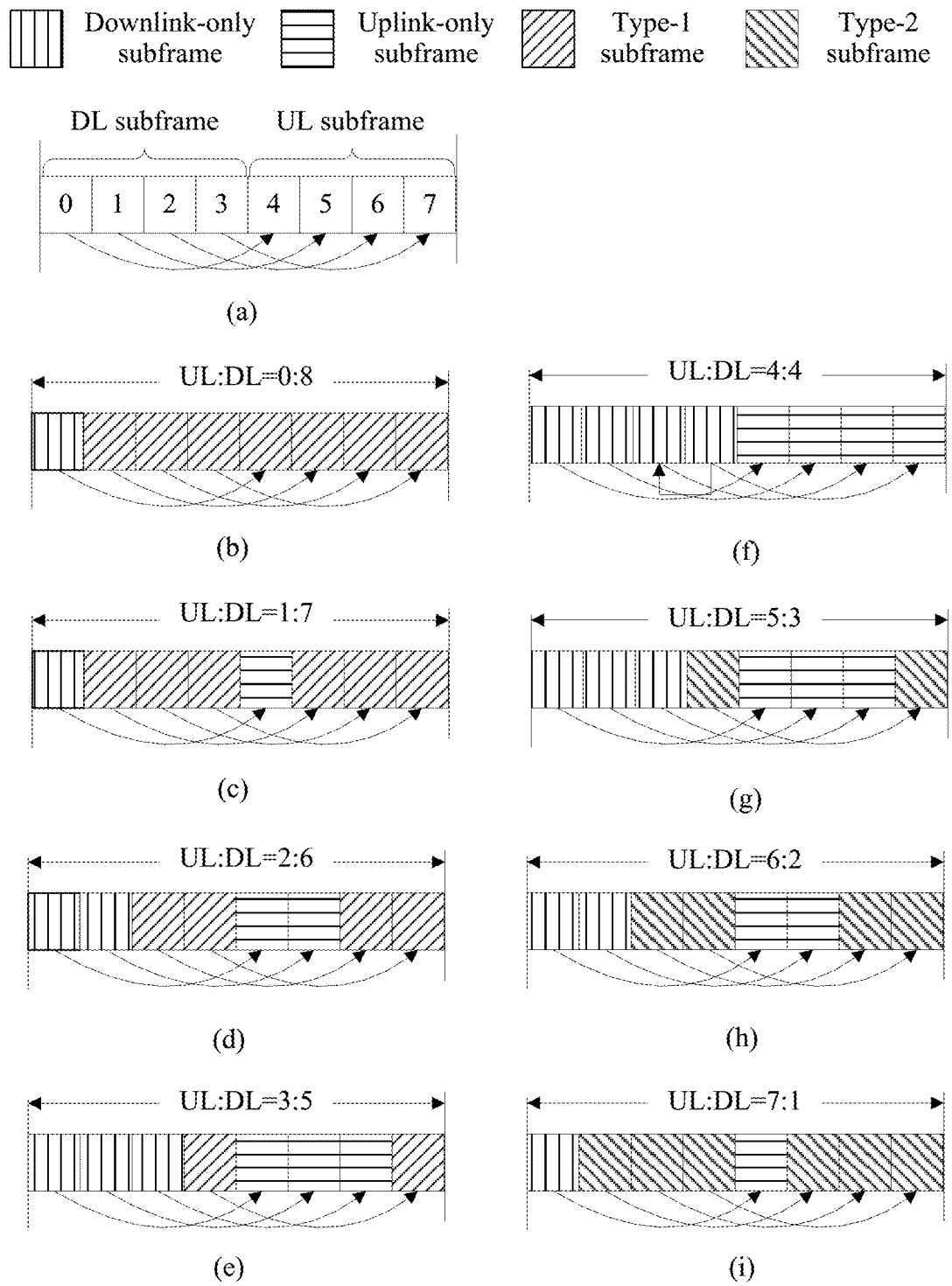
FIG. 10 is a schematic structural diagram of still another frame structure according to an embodiment of this application.

FIG. 10 is a schematic diagram of a frame structure of still another super frame according to an embodiment of this application. In FIG. 10, each frame includes eight subframes, that is, N=8. A distance between subframes corresponding to two ends of an arrow represents a timing length, and the timing length is four subframes, that is, K=4. A downlink subframe set offset is 0 subframes, that is, SFNSET_offset=0. A downlink subframe offset is 0, that is, SFNDL_offset=0. An uplink subframe offset is 0, that is, SFNUL_offset=0.

A quantity of subframes in the super frame is M=L.C.M. (4*2, 8)=8, and is equal to a length of one frame. It is assumed that the subframes in the super frame are numbered 0 to 7. As shown in (a) in FIG. 10, a downlink subframe set is {0, 1, 2, 3}, and an uplink subframe set is {4, 5, 6, 7}.

In the frame structure shown in FIG. 10, (b) in FIG. 10 is corresponding to a frame structure with an uplink-downlink subframe configuration ratio 0:8, and (c) to (i) in FIG. 10 are respectively corresponding to possible implementations of uplink-downlink subframe configuration ratios 1:7, 2:6, 3:5, 4:4, 5:3, 6:2, and 7:1.

As shown in (b) in FIG. 10, the frame structure with the uplink-downlink subframe configuration ratio 0:8 includes one downlink-only subframe and 7 type-1 subframes. A subframe number of the downlink-only subframe is ⌊SFNDL_offset/K⌋*2K+(SFNDL_offset mod K)+SFNSET_offset=⌊0/4⌋*8+(0 mod 4)+0=0. That is, a subframe 0 is the downlink-only subframe.

Frame structures shown in (c) to (i) in FIG. 10 each include one fixed downlink-only subframe and one fixed uplink-only subframe.

A subframe number of the fixed downlink-only subframe is ⌊SFNDL_offset/K⌋*2K+(SFNDL_offset mod K)+SFNSET_offset=⌊0/4⌋*8+(0 mod 4)+0=0. Therefore, the fixed downlink-only subframe is corresponding to the subframe 0.

A subframe number of the fixed uplink-only subframe is (⌊SFNUL_offset/K⌋*2K+K+SFNSET_offset+(SFNUL_offset mod K)) mod M=(⌊0/4⌋*8+4+0+(0 mod 4)) mod 8=4. Therefore, the fixed uplink-only subframe is corresponding to a subframe 4.

As shown in (f) in FIG. 10, a frame structure with the uplink-downlink subframe configuration ratio 1:1 (that is, 4:4) includes 10 downlink-only subframes and 10 uplink-only subframes. The specific frame structure is shown in (f) in FIG. 10. For a location of a GP symbol, refer to the example of the frame structure shown in (f) in FIG. 4. Details are not described herein again in this embodiment of this application.

As shown in (c), (d), and (e) in FIG. 10, a scenario with an uplink-downlink subframe configuration ratio a:(M−a) includes a downlink-only subframes, a uplink-only subframes, and (M−2a) type-1 subframes, where 0<a<M/2, that is, a value of a is 1, 2, or 3, and the uplink-downlink subframe configuration ratio in the scenario is (1:7, 2:6, or 3:5). The subframe 0 is the fixed downlink-only subframe, and the subframe 4 is the fixed uplink-only subframe. Remaining (a−1) downlink-only subframes are selected from subframes other than the subframe 0 in the downlink subframe set, (a−1) uplink-only subframes are selected from subframes other than the subframe 4 in the uplink subframe set, and locations of the (a−1) downlink-only subframes and the (a−1) uplink-only subframes may be unfixed. Finally remaining (M−2a) subframes are all type-1 subframes.

As shown in (g) and (h) in FIG. 10, a scenario with an uplink-downlink subframe configuration ratio a:(M−a) includes (M−a) downlink-only subframes, (M−a) uplink-only subframes, and (2a−M) type-2 subframes, where M/2<a<M, that is, a value of a is 5, 6, or 7, and the uplink-downlink subframe configuration ratio in the scenario is (5:3, 6:2, or 7:1). The subframe 0 is the fixed downlink-only subframe, and the subframe 4 is the fixed uplink-only subframe. Remaining (M−a−1) downlink-only subframes are selected from subframes other than the subframe 0 in the downlink subframe set, (M−a−1) uplink-only subframes are selected from subframes other than the subframe 4 in the uplink subframe set, and locations of the (M−a−1) downlink-only subframes and the (M−a−1) uplink-only subframes may be unfixed. Finally remaining (M−2a) subframes are all type-2 subframes.

It should be understood that, in a frame structure with the uplink-downlink subframe configuration ratio 1:7, a value of (a−1) is 0, and when the uplink-downlink subframe configuration ratio is 7:1, a value of (M−a−1) is 0. For the two uplink-downlink subframe configuration ratios, there is no uplink-only subframe other than the fixed uplink-only subframe, and there is no downlink-only subframe other than the fixed downlink-only subframe either.

In addition, the frame structure in the embodiments of this application may be applied to other scenarios with different frame lengths and timing lengths. The downlink subframe set offset, the downlink subframe offset, and the uplink subframe offset may be configured as other integers that meet a condition. Details are not described herein in this embodiment of this application.

Figure 11:
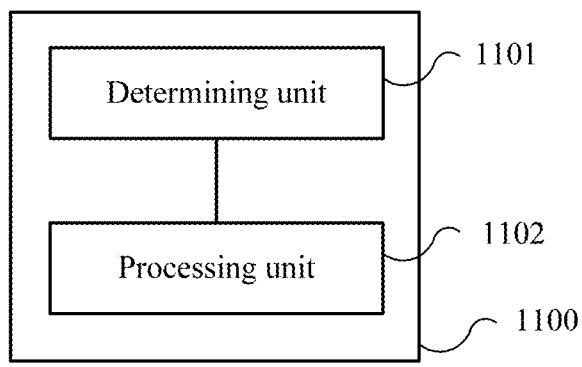
FIG. 11 is a schematic structural diagram of an information transmission apparatus according to an embodiment of this application.

FIG. 11 is a schematic block diagram of an information transmission apparatus 1100 according to an embodiment of this application. The apparatus may be a network side device such as a base station, a relay, or a wireless AP, or a user side device, for example, a mobile terminal such as a mobile phone. The information transmission apparatus 1100 in FIG. 11 may implement the method shown in FIG. 2. The information transmission apparatus 1100 may include:

a determining unit 1101, configured to determine a frame structure used for information transmission in a TDD system, where each frame based on the frame structure includes N subframes, a timing length is K subframes, and one super frame includes M consecutive subframes; and a processing unit 1102, configured to send and/or receive a message based on the frame structure, where N, K, and M are positive integers, M is a common multiple of N and 2K, each super frame includes at least one downlink-only subframe, and further includes at least one of an uplink-only subframe, a type-1 subframe, or a type-2 subframe, the downlink-only subframe includes a downlink symbol but does not include an uplink symbol, the type-1 subframe includes an uplink symbol and a downlink symbol, and a quantity of uplink symbols is less than that of downlink symbols, the type-2 subframe includes an uplink symbol and a downlink symbol, and a quantity of uplink symbols is greater than that of downlink symbols, and the uplink-only subframe includes an uplink symbol but does not include a downlink symbol. Preferably, M is a least common multiple of N and 2K.

It should be understood that, in this embodiment of this application, the timing length includes at least one of an uplink HARQ timing length, a downlink HARQ timing length, an uplink resource allocation timing length, or an aperiodic channel state information (Channel State Information, CSI) feedback timing length. When the timing length includes one timing length, the timing length is K subframes; or when the timing length includes a plurality of timing lengths, the plurality of timing lengths each are K subframes.

The uplink HARQ timing length is a required quantity of subframes between a subframe in which user equipment receives PDSCH transmission from a serving cell of the user equipment and a subframe in which the user equipment sends a corresponding hybrid repeat request acknowledgement response. For example, if a subframe in which the user equipment receives PDSCH transmission from the serving cell of the user equipment is a subframe n1, and a subframe in which the user equipment sends a corresponding hybrid repeat request acknowledgement response is a subframe (n1+k1), the uplink HARQ timing length is k1 subframes.

The downlink HARQ timing length is a required quantity of subframes between a subframe in which a serving cell receives PUSCH transmission from user equipment in the serving cell and a subframe in which the serving cell sends a corresponding hybrid repeat request acknowledgement response. For example, if a subframe in which the serving cell receives PUSCH transmission from the user equipment in the serving cell is a subframe n2, and a subframe in which the serving cell sends a corresponding hybrid repeat request acknowledgement response is a subframe (n2+k2), the downlink HARQ timing length is k2 subframes.

The uplink resource allocation timing length is a required quantity of subframes between a subframe in which user equipment receives, from a serving cell of the user equipment, uplink resource allocation signaling that indicates the user equipment and a subframe in which the user equipment sends uplink data on an indicated resource. For example, if a subframe in which the user equipment receives, from the serving cell of the user equipment, uplink resource allocation signaling that indicates the user equipment is a subframe n3, and a subframe in which the user equipment sends uplink data on an indicated resource is a subframe (n3+k3), the uplink resource allocation timing length is k3 subframes.

The aperiodic CSI feedback timing length is a required quantity of subframes between a subframe in which user equipment receives, from a serving cell of the user equipment, a downlink control channel that instructs the user equipment to perform an aperiodic CSI feedback and a subframe in which the user equipment performs a corresponding aperiodic CSI feedback. For example, if a subframe in which the user equipment receives, from the serving cell of the user equipment, a downlink control channel that instructs the user equipment to perform an aperiodic CSI feedback is a subframe n4, and a subframe in which the user equipment performs a corresponding aperiodic CSI feedback is a subframe (n4+k4), the aperiodic CSI feedback timing length is k4 subframes.

It should be understood that, in this embodiment of this application, the downlink-only subframe is used to send at least one of a PBCH, a synchronization signal, a PHICH, a PDCCH, an EPDCCH, or a PCFICH; and the uplink-only subframe is used to send at least one of a PRACH, an ACK, a NACK, CSI, or an SRS.

According to this embodiment of this application, the downlink-only subframe, the uplink-only subframe, the type-1 subframe, and the type-2 subframe are introduced to a radio frame, the frame structure used for information transmission in the TDD system is determined, and information is sent and received based on the frame structure, so that the system can provide a unified uplink-downlink timing relationship for different uplink-downlink subframe configuration ratios, uplink-downlink switching overheads can be reduced, and dynamic TDD can be implemented.

The information transmission apparatus 1100 may use the frame structure in the embodiments corresponding to FIG. 1, and FIG. 3 to FIG. 10.

For the specific frame structure, refer to the embodiments corresponding to FIG. 1, and FIG. 3 to FIG. 10. Details are not described herein again in this embodiment of this application.

Figure 12:
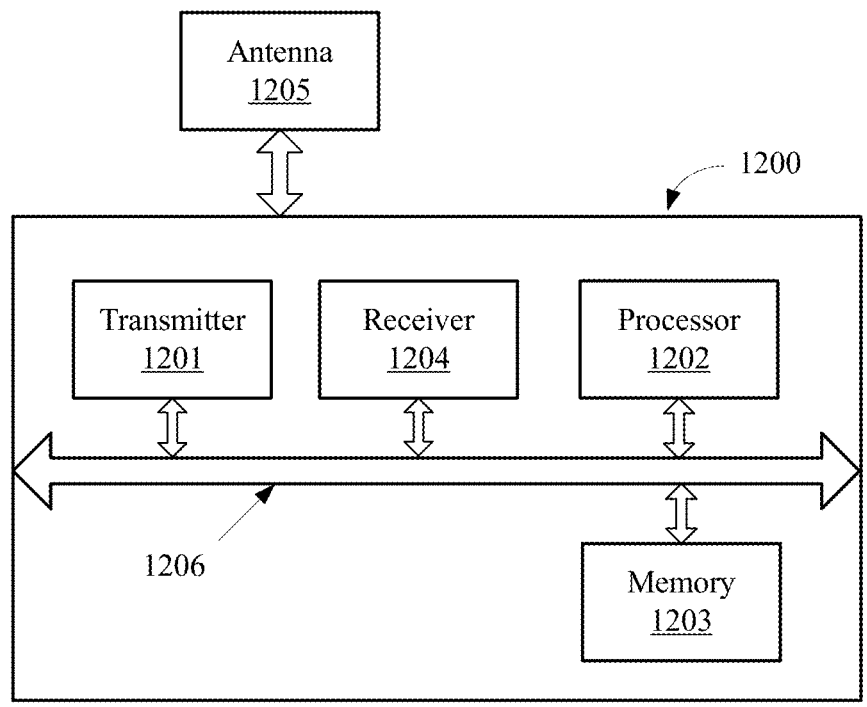
FIG. 12 is another schematic structural diagram of an information transmission apparatus according to an embodiment of this application.

FIG. 12 is a schematic structural diagram of an apparatus 1200 according to an embodiment of this application. The apparatus 1200 may include a processor 1202, a memory 1203, a transmitter 1201, and a receiver 1204. In specific application, the apparatus 1200 may be a network side device such as a base station, a relay, or a wireless AP, or a user side device, for example, a mobile terminal such as a mobile phone.

The receiver 1204, the transmitter 1201, the processor 1202, and the memory 1203 are connected to each other by using a bus system 1206. The bus 1206 may be an ISA bus, a PCI bus, an EISA bus, or the like. The bus may be classified into an address bus, a data bus, a control bus, and the like. For ease of indication, the bus is indicated by using only one double-headed arrow in FIG. 12. However, it does not mean that there is only one bus or only one type of bus. In specific application, the transmitter 1201 and the receiver 1204 may be coupled to an antenna 1205.

The memory 1203 is configured to store a program. Specifically, the program may include program code, and the program code includes a computer operation instruction. The memory 1203 may include a read-only memory and a random access memory, and provide an instruction and data for the processor 1202. The memory 1203 may include a high-speed RAM memory, or may include a nonvolatile memory (non-volatile memory) such as at least one magnetic disk storage.

The processor 1202 executes the program stored in the memory 1203 and is specifically configured to perform the following operations:

determining a frame structure used for information transmission in a time division duplex TDD system, where each frame based on the frame structure includes N subframes, a timing length is K subframes, and one super frame includes M consecutive subframes; and sending and/or receiving a message based on the frame structure, where N, K, and M are positive integers, M is a common multiple of N and 2K, each super frame includes at least one downlink-only subframe, and further includes at least one of an uplink-only subframe, a type-1 subframe, or a type-2 subframe, the downlink-only subframe includes a downlink symbol but does not include an uplink symbol, the type-1 subframe includes an uplink symbol and a downlink symbol, and a quantity of uplink symbols is less than that of downlink symbols, the type-2 subframe includes an uplink symbol and a downlink symbol, and a quantity of uplink symbols is greater than that of downlink symbols, and the uplink-only subframe includes an uplink symbol but does not include a downlink symbol. Preferably, M is a least common multiple of N and 2K.

It should be understood that, in this embodiment of this application, the timing length includes at least one of an uplink hybrid automatic repeat request HARQ timing length, a downlink HARQ timing length, an uplink resource allocation timing length, or an aperiodic CSI feedback timing length. Each super frame includes the downlink-only subframe, and further includes one or more of the uplink-only subframe, the type-1 subframe, the type-2 subframe, or the like. When the timing length includes one timing length, the timing length is K subframes; or when the timing length includes a plurality of timing lengths, the plurality of timing lengths each are K subframes.

The uplink HARQ timing length is a required quantity of subframes between a subframe in which user equipment receives PDSCH transmission from a serving cell of the user equipment and a subframe in which the user equipment sends a corresponding hybrid repeat request acknowledgement response. For example, if a subframe in which the user equipment receives PDSCH transmission from the serving cell of the user equipment is a subframe n1, and a subframe in which the user equipment sends a corresponding hybrid repeat request acknowledgement response is a subframe (n1+k1), the uplink HARQ timing length is k1 subframes.

The downlink HARQ timing length is a required quantity of subframes between a subframe in which a serving cell receives PUSCH transmission from user equipment in the serving cell and a subframe in which the serving cell sends a corresponding hybrid repeat request acknowledgement response. For example, if a subframe in which the serving cell receives PUSCH transmission from the user equipment in the serving cell is a subframe n2, and a subframe in which the serving cell sends a corresponding hybrid repeat request acknowledgement response is a subframe (n2+k2), the downlink HARQ timing length is k2 subframes.

The uplink resource allocation timing length is a required quantity of subframes between a subframe in which user equipment receives, from a serving cell of the user equipment, uplink resource allocation signaling that indicates the user equipment and a subframe in which the user equipment sends uplink data on an indicated resource. For example, if a subframe in which the user equipment receives, from the serving cell of the user equipment, uplink resource allocation signaling that indicates the user equipment is a subframe n3, and a subframe in which the user equipment sends uplink data on an indicated resource is a subframe (n3+k3), the uplink resource allocation timing length is k3 subframes.

The aperiodic CSI feedback timing length is a required quantity of subframes between a subframe in which user equipment receives, from a serving cell of the user equipment, a downlink control channel that instructs the user equipment to perform an aperiodic CSI feedback and a subframe in which the user equipment performs a corresponding aperiodic CSI feedback. For example, if a subframe in which the user equipment receives, from the serving cell of the user equipment, a downlink control channel that instructs the user equipment to perform an aperiodic CSI feedback is a subframe n4, and a subframe in which the user equipment performs a corresponding aperiodic CSI feedback is a subframe (n4+k4), the aperiodic CSI feedback timing length is k4 subframes.

It should be understood that, in this embodiment of this application, the downlink-only subframe is used to send at least one of a PBCH, a synchronization signal, a PHICH, a PDCCH, an EPDCCH, or a PCFICH.

It should be understood that, in this embodiment of this application, the uplink-only subframe is used to send at least one of a PRACH, an ACK, a NACK, CSI, or an SRS.

The method disclosed in FIG. 2 may be applied to the processor 1202, or may be implemented by the processor 1202. The processor 1202 may be an integrated circuit chip and has a signal processing capability. In an implementation process, the steps in the foregoing methods may be completed by means of an integrated logic circuit of hardware in the processor 1202 or an instruction in a form of software. The processor 1202 may be a general-purpose processor that includes a central processing unit (Central Processing Unit, CPU for short), a network processor (Network Processor, NP for short), and the like; or may be a digital signal processor (DSP), an application-specific integrated circuit (ASIC), a field programmable gate array (FPGA) or another programmable logic device, a discrete gate or a transistor logic device, or a discrete hardware component. The processor 1202 can implement or perform methods, steps, and logical block diagrams disclosed in the embodiments of this application. The general-purpose processor may be a microprocessor, or the processor may be any normal processor, or the like. Optionally, the processor may be a dedicated processor such as a baseband processing chip. A software module may be located in a mature storage medium in the art, such as a random access memory, a flash memory, a read-only memory, a programmable read-only memory, an electrically erasable programmable memory, or a register. The storage medium is located in the memory 1203. The processor 1202 reads information in the memory 1203, and completes the steps of the foregoing method with reference to hardware of the memory 1203.

According to this embodiment of this application, the apparatus 1200 introduces the downlink-only subframe, the uplink-only subframe, the type-1 subframe, and the type-2 subframe to a radio frame, determines a frame structure used for information transmission in the TDD system, and sends and receives information based on the frame structure, so that the system can provide a unified uplink-downlink timing relationship for different uplink-downlink subframe configuration ratios, uplink-downlink switching overheads can be reduced, and dynamic TDD can be implemented.

The apparatus 1200 may use the frame structure in the embodiments corresponding to FIG. 1, and FIG. 3 to FIG. 10. For the specific frame structure, refer to the embodiments corresponding to FIG. 1, and FIG. 3 to FIG. 10. Details are not described herein again in this embodiment of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission apparatus, comprising:
   a memory to store instructions; and
   a processor to execute the instructions to configure the information transmission apparatus to:
   determine a frame structure used for information transmission in a time division duplex (TDD) system, wherein each frame based on the frame structure comprises N subframes with a distance between subframes representing a timing length having a value of K subframes, and one super frame having one or more frames with the frame structure comprises M consecutive subframes; and
   send and/or receive a message in the TDD system based on the frame structure, wherein
   N, K, and M are positive integers, M is a common multiple of N and 2K, each super frame comprises at least one downlink-only subframe, and further comprises at least one of an uplink-only subframe, a type-1 subframe, or a type-2 subframe, the downlink-only subframe comprises downlink symbols and no uplink symbol, the type-1 subframe comprises at least one uplink symbol and at least one downlink symbol, and a quantity of uplink symbols is less than that of downlink symbols, the type-2 subframe comprises at least one uplink symbol and at least one downlink symbol, and a quantity of uplink symbols is greater than that of downlink symbols, and the uplink-only subframe comprises uplink symbols but no downlink symbol.

2. The apparatus according to claim 1, wherein
   an uplink-downlink subframe configuration ratio of the super frame is 0:M, the super frame comprises one downlink-only subframe with a subframe number of $\lfloor SFNDL\_offset/K \rfloor*2K+(SFNDL\_offset \bmod K)+SFNSET\_offset$, and type-1 subframes as remaining subframes; and
   SFNSET_offset represents an offset of a first subframe in a downlink subframe set of the super frame relative to a first subframe in the super frame, and a value of the offset is an integer from 0 to (K−1); SFNDL_offset represents an offset of the downlink-only subframe relative to the first subframe in the downlink subframe set, and a value of the offset is an integer from 0 to (M/2−1); and the downlink subframe set is a set of subframes in the super frame that have subframe numbers m meeting a condition that $\lfloor (m-SFNSET\_offset)/K \rfloor$ is an even number.

3. The apparatus according to claim 1, wherein
   an uplink-downlink subframe configuration ratio of the super frame is 1:1, a downlink subframe set of the super frame comprises only the downlink-only subframe, and an uplink subframe set of the super frame comprises only the uplink-only subframe; and
   the downlink subframe set is a set of subframes in the super frame that have subframe numbers m meeting a condition that $\lfloor (m-SFNSET\_offset)/K \rfloor$ is an even number, the uplink subframe set is a set of subframes in the super frame that have subframe numbers m meeting a condition that $\lfloor (m-SFNSET\_offset)/K \rfloor$ is an odd number, SFNSET_offset represents an offset of the first subframe in the downlink subframe set of the super frame relative to the first subframe in the super frame, and a value of the offset is an integer from 0 to (K−1).

4. The apparatus according to claim 3, wherein
   a last symbol of a last downlink-only subframe in consecutive downlink-only subframes in the super frame is a guard period (GP) symbol, or a first symbol of a first downlink-only subframe in consecutive downlink-only subframes in the super frame is a GP symbol, or a first symbol of a first uplink-only subframe in consecutive uplink-only subframes in the super frame is a GP symbol, or a last symbol of a last uplink-only subframe in consecutive uplink-only subframes in the super frame is a GP symbol.

5. The apparatus according to claim 1, wherein
an uplink-downlink subframe configuration ratio of the super frame is a:(M−a), a downlink subframe set of the super frame comprises a downlink-only subframes and (M/2−a) type-1 subframes, a subframe X in the super frame is a fixed downlink-only subframe in the a downlink-only subframes, an uplink subframe set of the super frame comprises a uplink-only subframes and (M/2−a) type-1 subframes, and a subframe Y in the super frame is a fixed uplink-only subframe in the a uplink-only subframes; and
0<a<M/2, a is a positive integer, a value of X is ⌊SFNDL_offset/K⌋*2K+(SFNDL_offset mod K)+SFNSET_offset, a value of Y is (⌊SFNUL_offset/K⌋*2K+K+SFNSET_offset+(SFNUL_offset mod K)) mod M, the downlink subframe set is a set of subframes in the super frame that have subframe numbers m meeting a condition that ⌊(m−SFNSET_offset)/K⌋ is an even number, the uplink subframe set is a set of subframes in the super frame that have subframe numbers m meeting a condition that ⌊(m−SFNSET_offset)/K⌋ is an odd number, SFNSET_offset represents an offset of the first subframe in the downlink subframe set of the super frame relative to the first subframe in the super frame, and a value of the offset is an integer from 0 to (K−1), SFNDL_offset represents an offset of the fixed downlink-only subframe relative to the first subframe in the downlink subframe set, and a value of the offset is an integer from 0 to (M/2−1), and SFNUL_offset represents an offset of the fixed uplink-only subframe relative to a first subframe that is after a first subframe in the downlink subframe set and that belongs to the uplink subframe set, and a value of the offset is an integer from 0 to (M/2−1).

6. The apparatus according to claim 1, wherein
an uplink-downlink subframe configuration ratio of the super frame is a:(M−a), a downlink subframe set of the super frame comprises (M−a) downlink-only subframes and (a−M/2) type-2 subframes, a subframe X in the super frame is a fixed downlink-only subframe in the (M−a) downlink-only subframes, an uplink subframe set of the super frame comprises (M−a) uplink-only subframes and (a−M/2) type-2 subframes, and a subframe Y in the super frame is a fixed uplink-only subframe in the (M−a) uplink-only subframes; and
M/2<a<M, a is a positive integer, a value of X is ⌊SFNDL_offset/K⌋*2K+(SFNDL_offset mod K)+SFNSET_offset, a value of Y is (⌊SFNUL_offset/K⌋*2K+K+SFNSET_offset+(SFNUL_offset mod K)) mod M, the downlink subframe set is a set of subframes in the super frame that have subframe numbers m meeting a condition that ⌊(m−SFNSET_offset)/K⌋ is an even number, the uplink subframe set is a set of subframes in the super frame that have subframe numbers m meeting a condition that ⌊(m−SFNSET_offset)/K⌋ is an odd number, SFNSET_offset represents an offset of the first subframe in the downlink subframe set of the super frame relative to the first subframe in the super frame, and a value of the offset is an integer from 0 to (K−1), SFNDL_offset represents an offset of the fixed downlink-only subframe relative to the first subframe in the downlink subframe set, and a value of the offset is an integer from 0 to (M/2−1), and SFNUL_offset represents an offset of the fixed uplink-only subframe relative to a first subframe that is after a first subframe in the downlink subframe set and that belongs to the uplink subframe set, and a value of the offset is an integer from 0 to (M/2−1).

7. The apparatus according claim 1, wherein
the downlink-only subframe is used to send at least one of a physical broadcast channel (PBCH), a synchronization signal, a physical hybrid automatic repeat request indicator channel PHICH, a physical downlink control channel (PDCCH), an enhanced physical downlink control channel (EPDCCH), or a physical control format indicator channel (PCFICH).

8. The apparatus according to claim 1, wherein
the uplink-only subframe is used to send at least one of a physical random access channel (PRACH), a feedback acknowledgement (ACK), a feedback negative acknowledgement (NACK), channel state information (CSI), or a sounding reference signal (SRS).

9. The apparatus according to claim 1, wherein the apparatus is a base station or user equipment.

10. A method for information transmission in a system, comprising:
determining, by an information transmission apparatus, a frame structure used for information transmission in a time division duplex (TDD) system, wherein each frame based on the frame structure comprises N subframes with a distance between subframes representing a timing length having a value of K subframes, and one super frame having one of more frames with the frame structure comprises M consecutive subframes; and
sending and/or receiving, by the information transmission apparatus, a message based on the frame structure, wherein
N, K, and M are positive integers, M is a common multiple of N and 2K, each super frame comprises at least one downlink-only subframe, and further comprises at least one of an uplink-only subframe, a type-1 subframe, or a type-2 subframe, the downlink-only subframe comprises downlink symbols and no uplink symbol, the type-1 subframe comprises at least one uplink symbol and at least one downlink symbol, and a quantity of uplink symbols is less than that of downlink symbols, the type-2 subframe comprises at least one uplink symbol and at least one downlink symbol, and a quantity of uplink symbols is greater than that of downlink symbols, and the uplink-only subframe comprises uplink symbol and no downlink symbol.

11. The method according to claim 10, wherein
an uplink-downlink subframe configuration ratio of the super frame is 0:M, the super frame comprises one downlink-only subframe: a subframe ⌊SFNDL_offset/K⌋*2K+(SFNDL_offset mod K)+SFNSET_offset, and remaining subframes are type-1 subframes; and
SFNSET_offset is used to represent an offset of the first subframe in a downlink subframe set of the super frame relative to the first subframe in the super frame, and a value of the offset is an integer from 0 to (K−1); SFNDL_offset is used to represent an offset of the downlink-only subframe relative to the first subframe in the downlink subframe set, and a value of the offset is an integer from 0 to (M/2−1); and the downlink subframe set is a set of subframes in the super frame that have subframe numbers m meeting a condition: ⌊(m−SFNSET_offset)/K⌋ is an even number.

12. The method according to claim 10, wherein
an uplink-downlink subframe configuration ratio of the super frame is 1:1, a downlink subframe set of the super frame comprises only the downlink-only subframe, and an uplink subframe set of the super frame comprises only the uplink-only subframe; and
the downlink subframe set is a set of subframes in the super frame that have subframe numbers m meeting a condition: $\lfloor(\text{m}-\text{SFNSET\_offset})/\text{K}\rfloor$ is an even number, the uplink subframe set is a set of subframes in the super frame that have subframe numbers m meeting a condition: $\lfloor(\text{m}-\text{SFNSET\_offset})/\text{K}\rfloor$ is an odd number, SFNSET_offset is used to represent an offset of the first subframe in the downlink subframe set of the super frame relative to the first subframe in the super frame, and a value of the offset is an integer from 0 to (K−1).

13. The method according to claim 12, wherein
the last symbol of the last downlink-only subframe in consecutive downlink-only subframes in the super frame is a guard period (GP) symbol, or the first symbol of the first downlink-only subframe in consecutive downlink-only subframes in the super frame is a GP symbol, or the first symbol of the first uplink-only subframe in consecutive uplink-only subframes in the super frame is a GP symbol, or the last symbol of the last uplink-only subframe in consecutive uplink-only subframes in the super frame is a GP symbol.

14. The method according to claim 10, wherein
an uplink-downlink subframe configuration ratio of the super frame is a:(M−a), a downlink subframe set of the super frame comprises a downlink-only subframes and (M/2−a) type-1 subframes, a subframe X in the super frame is a fixed downlink-only subframe in the a downlink-only subframes, an uplink subframe set of the super frame comprises a uplink-only subframes and (M/2−a) type-1 subframes, and a subframe Y in the super frame is a fixed uplink-only subframe in the a uplink-only subframes; and
0<a<M/2, a is a positive integer, the downlink subframe set is a set of subframes in the super frame that have subframe numbers m meeting a condition: $\lfloor(\text{m}-\text{SFNSET\_offset})/\text{K}\rfloor$ is an even number, the uplink subframe set is a set of subframes in the super frame that have subframe numbers m meeting a condition: $\lfloor(\text{m}-\text{SFNSET\_offset})/\text{K}\rfloor$ is an odd number, a value of X is $\lfloor\text{SFNDL\_offset}/\text{K}\rfloor*2\text{K}+(\text{SFNDL\_offset mod K})+\text{SFNSET\_offset}$, a value of Y is $(\lfloor\text{SFNUL\_offset}/\text{K}\rfloor*2\text{K}+\text{K}+\text{SFNSET\_offset}+(\text{SFNUL\_offset mod K})) \bmod \text{M}$, SFNSET_offset is used to represent an offset of the first subframe in the downlink subframe set of the super frame relative to the first subframe in the super frame, and a value of the offset is an integer from 0 to (K−1), SFNDL_offset is used to represent an offset of the fixed downlink-only subframe relative to the first subframe in the downlink subframe set, and a value of the offset is an integer from 0 to (M/2−1), and SFNUL_offset is used to represent an offset of the fixed uplink-only subframe relative to the first subframe that is after the first subframe in the downlink subframe set and that belongs to the uplink subframe set, and a value of the offset is an integer from 0 to (M/2−1).

15. The method according to claim 10, wherein
an uplink-downlink subframe configuration ratio of the super frame is a:(M−a), a downlink subframe set of the super frame comprises (M−a) downlink-only subframes and (a−M/2) type-2 subframes, a subframe X in the super frame is a fixed downlink-only subframe in the (M−a) downlink-only subframes, an uplink subframe set of the super frame comprises (M−a) uplink-only subframes and (a−M/2) type-2 subframes, and a subframe Y in the super frame is a fixed uplink-only subframe in the (M−a) uplink-only subframes; and
M/2<a<M, a is a positive integer, a value of X is $\lfloor\text{SFNDL\_offset}/\text{K}\rfloor*2\text{K}+(\text{SFNDL\_offset mod K})+\text{SFNSET\_offset}$, a value of Y is $(\lfloor\text{SFNUL\_offset}/\text{K}\rfloor*2\text{K}+\text{K}+\text{SFNSET\_offset}+(\text{SFNUL\_offset mod K})) \bmod \text{M}$, the downlink subframe set is a set of subframes in the super frame that have subframe numbers m meeting a condition: $\lfloor(\text{m}-\text{SFNSET\_offset})/\text{K}\rfloor$ is an even number, the uplink subframe set is a set of subframes in the super frame that have subframe numbers m meeting a condition: $\lfloor(\text{m}-\text{SFNSET\_offset})/\text{K}\rfloor$ is an odd number, SFNSET_offset is used to represent an offset of the first subframe in the downlink subframe set of the super frame relative to the first subframe in the super frame, and a value of the offset is an integer from 0 to (K−1), SFNDL_offset is used to represent an offset of the fixed downlink-only subframe relative to the first subframe in the downlink subframe set, and a value of the offset is an integer from 0 to (M/2−1), and SFNUL_offset is used to represent an offset of the fixed uplink-only subframe relative to the first subframe that is after the first subframe in the downlink subframe set and that belongs to the uplink subframe set, and a value of the offset is an integer from 0 to (M/2−1).

16. An information transmission apparatus, comprising:
a memory to store instructions;
a processor in communication with the memory to execute the instructions to determine a frame structure used for information transmission in a time division duplex (TDD) system, wherein each frame based on the frame structure comprises N subframes with a distance between subframes representing a timing length having a value of K subframes, and one super frame having one or more frames with the frame structure comprises M consecutive subframes;
a transmitter in communication with the processor to send a message in the TDD system based on the frame structure; and
a receiver in communication with the processor to receive the message in the TDD system based on the frame structure, wherein
N, K, and M are positive integers, M is a common multiple of N and 2K, each super frame comprises at least one downlink-only subframe, and further comprises at least one of an uplink-only subframe, a type-1 subframe, or a type-2 subframe, the downlink-only subframe comprises downlink symbols and no uplink symbol, the type-1 subframe comprises at least one uplink symbol and at least one downlink symbol, and a quantity of uplink symbols is less than that of downlink symbols, the type-2 subframe comprises at least one uplink symbol and at least one downlink symbol, and a quantity of uplink symbols is greater than that of downlink symbols, and the uplink-only subframe comprises uplink symbols but no downlink symbol.

17. The apparatus according to claim 16, wherein
an uplink-downlink subframe configuration ratio of the super frame is 0:M, the super frame comprises one downlink-only subframe with a subframe number of $\lfloor\text{SFNDL\_offset}/\text{K}\rfloor*2\text{K}+(\text{SFNDL\_offset mod K})+\text{SFNSET\_offset}$, and type-1 subframes as remaining subframes; and SFNSET_offset represents an offset of a first subframe in a downlink subframe set of the super frame relative to a first subframe in the super frame, and a value of the offset is an integer from 0 to (K−1); SFNDL_offset represents an offset of the downlink-only subframe relative to the first subframe in the downlink subframe set, and a value of the offset is an integer from 0 to (M/2−1); and the downlink subframe set is a set of subframes in the super frame that have subframe numbers m meeting a condition that $\lfloor(m-\text{SFNSET\_offset})/K\rfloor$ is an even number.

18. The apparatus according to claim 16, wherein
an uplink-downlink subframe configuration ratio of the super frame is 1:1, a downlink subframe set of the super frame comprises only the downlink-only subframe, and an uplink subframe set of the super frame comprises only the uplink-only subframe; and
the downlink subframe set is a set of subframes in the super frame that have subframe numbers m meeting a condition that $\lfloor(m-\text{SFNSET\_offset})/K\rfloor$ is an even number, the uplink subframe set is a set of subframes in the super frame that have subframe numbers m meeting a condition that $\lfloor(m-\text{SFNSET\_offset})/K\rfloor$ is an odd number, SFNSET_offset represents an offset of the first subframe in the downlink subframe set of the super frame relative to the first subframe in the super frame, and a value of the offset is an integer from 0 to (K−1).

19. The apparatus according to claim 18, wherein
a last symbol of a last downlink-only subframe in consecutive downlink-only subframes in the super frame is a guard period (GP) symbol, or a first symbol of a first downlink-only subframe in consecutive downlink-only subframes in the super frame is a GP symbol, or a first symbol of a first uplink-only subframe in consecutive uplink-only subframes in the super frame is a GP symbol, or a last symbol of a last uplink-only subframe in consecutive uplink-only subframes in the super frame is a GP symbol.

20. The apparatus according to claim 16, wherein
an uplink-downlink subframe configuration ratio of the super frame is a:(M−a), a downlink subframe set of the super frame comprises a downlink-only subframes and (M/2−a) type-1 subframes, a subframe X in the super frame is a fixed downlink-only subframe in the a downlink-only subframes, an uplink subframe set of the super frame comprises a uplink-only subframes and (M/2−a) type-1 subframes, and a subframe Y in the super frame is a fixed uplink-only subframe in the a uplink-only subframes; and
$0<a<M/2$, a is a positive integer, a value of X is $\lfloor\text{SFNDL\_offset}/K\rfloor*2K+(\text{SFNDL\_offset mod }K)+\text{SFNSET\_offset}$, a value of Y is $(\lfloor\text{SFNUL\_offset}/K\rfloor*2K+K+\text{SFNSET\_offset}+(\text{SFNUL\_offset mod }K))\text{ mod }M$, the downlink subframe set is a set of subframes in the super frame that have subframe numbers m meeting a condition that $\lfloor(m-\text{SFNSET\_offset})/K\rfloor$ is an even number, the uplink subframe set is a set of subframes in the super frame that have subframe numbers m meeting a condition that $\lfloor(m-\text{SFNSET\_offset})/K\rfloor$ is an odd number, SFNSET_offset represents an offset of the first subframe in the downlink subframe set of the super frame relative to the first subframe in the super frame, and a value of the offset is an integer from 0 to (K−1), SFNDL_offset represents an offset of the fixed downlink-only subframe relative to the first subframe in the downlink subframe set, and a value of the offset is an integer from 0 to (M/2−1), and SFNUL_offset represents an offset of the fixed uplink-only subframe relative to a first subframe that is after a first subframe in the downlink subframe set and that belongs to the uplink subframe set, and a value of the offset is an integer from 0 to (M/2−1).

21. The apparatus according to claim 16, wherein
an uplink-downlink subframe configuration ratio of the super frame is a:(M−a), a downlink subframe set of the super frame comprises (M−a) downlink-only subframes and (a−M/2) type-2 subframes, a subframe X in the super frame is a fixed downlink-only subframe in the (M−a) downlink-only subframes, an uplink subframe set of the super frame comprises (M−a) uplink-only subframes and (a−M/2) type-2 subframes, and a subframe Y in the super frame is a fixed uplink-only subframe in the (M−a) uplink-only subframes; and
$M/2<a<M$, a is a positive integer, a value of X is $\lfloor\text{SFNDL\_offset}/K\rfloor*2K+(\text{SFNDL\_offset mod }K)+\text{SFNSET\_offset}$, a value of Y is $(\lfloor\text{SFNUL\_offset}/K\rfloor*2K+K+\text{SFNSET\_offset}+(\text{SFNUL\_offset mod }K))\text{ mod }M$, the downlink subframe set is a set of subframes in the super frame that have subframe numbers m meeting a condition that $\lfloor(m-\text{SFNSET\_offset})/K\rfloor$ is an even number, the uplink subframe set is a set of subframes in the super frame that have subframe numbers m meeting a condition that $\lfloor(m-\text{SFNSET\_offset})/K\rfloor$ is an odd number, SFNSET_offset represents an offset of the first subframe in the downlink subframe set of the super frame relative to the first subframe in the super frame, and a value of the offset is an integer from 0 to (K−1), SFNDL_offset represents an offset of the fixed downlink-only subframe relative to the first subframe in the downlink subframe set, and a value of the offset is an integer from 0 to (M/2−1), and SFNUL_offset represents an offset of the fixed uplink-only subframe relative to a first subframe that is after a first subframe in the downlink subframe set and that belongs to the uplink subframe set, and a value of the offset is an integer from 0 to (M/2−1).

22. The apparatus according claim 16, wherein
the downlink-only subframe is used to send at least one of a physical broadcast channel (PBCH), a synchronization signal, a physical hybrid automatic repeat request indicator channel (PHICH), a physical downlink control channel (PDCCH), an enhanced physical downlink control channel (EPDCCH), or a physical control format indicator channel (PCFICH).

23. The apparatus according to claim 16, wherein
the uplink-only subframe is used to send at least one of a physical random access channel (PRACH), a feedback acknowledgement (ACK), a feedback negative acknowledgement (NACK), channel state information or a sounding reference signal (SRS).

* * * * *